United States Patent
Nagano

(10) Patent No.: US 11,287,606 B2
(45) Date of Patent: Mar. 29, 2022

(54) IMAGING LENS SYSTEM AND IMAGING DEVICE

(71) Applicant: Ricoh Company, Ltd., Tokyo (JP)

(72) Inventor: Takuya Nagano, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 278 days.

(21) Appl. No.: 16/388,902

(22) Filed: Apr. 19, 2019

(65) Prior Publication Data
US 2019/0384035 A1    Dec. 19, 2019

(30) Foreign Application Priority Data
Jun. 19, 2018 (JP) .............................. JP2018-115980

(51) Int. Cl.
*G02B 7/10* (2021.01)
*G02B 9/12* (2006.01)
*G02B 27/00* (2006.01)

(52) U.S. Cl.
CPC .............. *G02B 7/10* (2013.01); *G02B 9/12* (2013.01); *G02B 27/0025* (2013.01)

(58) Field of Classification Search
CPC ... G02B 7/10; G02B 9/12; G02B 9/34; G02B 13/001; G02B 13/0015; G02B 13/0035; G02B 13/0045; G02B 13/005; G02B 13/0055; G02B 13/006; G02B 27/0025
USPC ....... 359/716, 717, 738, 739, 740, 754, 784, 359/791, 792, 794
See application file for complete search history.

(56) References Cited

U.S. PATENT DOCUMENTS

| 5,331,465 A | * | 7/1994 | Miyano | .................. | G02B 13/00 |
| | | | | | 359/693 |
| 2002/0048092 A1 | | 4/2002 | Yoneyama | | |
| 2003/0165018 A1 | | 9/2003 | Mihara | | |
| 2008/0247058 A1 | | 10/2008 | Kato | | |
| 2009/0153980 A1 | * | 6/2009 | Yamamoto | ........... | G02B 27/646 |
| | | | | | 359/693 |

(Continued)

FOREIGN PATENT DOCUMENTS

| CN | 1283799 A | 2/2001 |
| CN | 1825154 A | 8/2006 |

(Continued)

OTHER PUBLICATIONS

Office Action dated Apr. 6, 2021 issued in corresponding Chinese patent Application No. 201910514649.8.

*Primary Examiner* — Marin Pichler
(74) *Attorney, Agent, or Firm* — Xsensus LLP

(57) ABSTRACT

An imaging lens system includes a first lens; a stop; a second lens group; and a third lens group, disposed in that order from an object side to an image side. A combination of the first lens group and the second lens group moves together as a single unit to the object side in focusing from infinity to a close distance to increase a distance between the second lens group and the third lens group. Conditional expression (1) below being satisfied:

$$0.40 < dL31-L32/L3g < 0.75 \qquad (1)$$

where
dL31–L32 denotes air spacing between the third-group-first negative lens and the third-group-second positive lens in the third lens group, and (Continued)

L3g denotes a distance along the optical axis between an object-side surface of the third-group-first negative lens and an image-side surface of the third-group-second positive lens.

14 Claims, 26 Drawing Sheets

(56) References Cited

U.S. PATENT DOCUMENTS

| | | | |
|---|---|---|---|
| 2012/0081799 A1 | 4/2012 | Tseng et al. | |
| 2012/0257100 A1* | 10/2012 | Imaoka | G02B 9/14 348/360 |
| 2014/0293457 A1 | 10/2014 | Sudoh | |
| 2015/0293327 A1* | 10/2015 | Tomioka | G02B 13/02 359/754 |
| 2016/0077309 A1 | 3/2016 | Ohashi et al. | |

FOREIGN PATENT DOCUMENTS

| | | |
|---|---|---|
| CN | 1837889 A | 9/2006 |
| CN | 101004475 A | 7/2007 |
| CN | 104094157 A | 10/2014 |
| CN | 106526794 A | 3/2017 |
| CN | 106918900 A | 7/2017 |
| CN | 107037574 A | 8/2017 |
| CN | 107783256 A | 3/2018 |
| JP | 62-220915 A | 9/1987 |
| JP | 2-134610 | 5/1990 |
| JP | 8-15609 A | 1/1996 |
| JP | 9-325272 A | 12/1997 |
| JP | 10-301029 A | 11/1998 |
| JP | 2003-121741 A | 4/2003 |
| JP | 2010-175628 | 8/2010 |
| JP | 2013-218015 | 10/2013 |
| JP | 2016-061919 | 4/2016 |
| KR | 10-2015-0070876 A | 6/2015 |
| WO | 2013/099214 A1 | 4/2013 |

\* cited by examiner

FIG. 30

|    | R       | D        | Nd      | νd    | θg,F   | REMARKS                  |
|----|---------|----------|---------|-------|--------|--------------------------|
| 1  | 19.139  | 5.00     | 1.61800 | 63.33 | 0.5441 | FIRST LENS               |
| 2  | 160.785 | 0.15     |         |       |        |                          |
| 3  | 13.136  | 4.21     | 1.51633 | 64.14 |        | SECOND LENS              |
| 4  | 7.584   | 4.72     |         |       |        |                          |
| 5  | 0.000   | 3.33     |         |       |        | STOP                     |
| 6  | -8.324  | 0.73     | 1.62588 | 35.70 |        | THIRD LENS               |
| 7  | 27.627  | 3.92     | 1.69680 | 55.53 |        | FOURTH LENS              |
| 8  | -11.353 | 0.90     |         |       |        |                          |
| 9  | 58.705  | 2.29     | 1.62041 | 60.29 |        | FIFTH LENS               |
| 10 | -27.888 | A        |         |       |        |                          |
| 11 | 198.083 | 3.24     | 1.80518 | 25.42 |        | SIXTH LENS               |
| 12 | 17.716  | 5.64     |         |       |        |                          |
| 13 | 26.193  | 2.13     | 1.96300 | 24.11 |        | SEVENTH LENS             |
| 14 | 432.466 | 12.05801 |         |       |        |                          |
| 15 | 0.000   | 0.75     | 1.51633 | 64.14 |        | COMPONENT SUCH AS FILTER |
| 16 | 0.000   | BF       |         |       |        |                          |

FIG. 31

| WD | INFINITY | 0.25m | 0.10m  |
|----|----------|-------|--------|
| A  | 2.040    | 5.486 | 11.048 |

FIG. 32

| dL31-L32/L3g                              | 0.51    |
|-------------------------------------------|---------|
| nd                                        | 1.61800 |
| νd                                        | 63.33   |
| θg,f                                      | 0.5441  |
| θg,f-(-0.001742 × νdn+0.6490)             | 0.0054  |
| νdn                                       | 64.14   |
| νdn-νdp                                   | 0.81    |
| f1g2g/f                                   | 0.83    |
| (RL11a-RL12b)/(RL11a+RL21b)               | 0.43    |
| fL11/fL12                                 | -0.74   |
| (RL12b-RL21a)/(RL12b+RL21a)               | -0.05   |
| (RL22b-RL21a)/(RL22b+RL21a)               | 0.15    |
| (RL23b-RL21a)/(RL23b+RL21a)               | 0.54    |

FIG. 33

|    | R       | D       | Nd      | $\nu$ d | $\theta_{g,F}$ | REMARKS |
|----|---------|---------|---------|---------|---------|---------|
| 1  | 19.432  | 5.00    | 1.61800 | 63.33   | 0.5441  | FIRST LENS |
| 2  | 164.215 | 0.15    |         |         |         |         |
| 3  | 13.301  | 4.35    | 1.51633 | 64.14   |         | SECOND LENS |
| 4  | 7.622   | 5.13    |         |         |         |         |
| 5  | 0.000   | 2.77    |         |         |         | STOP    |
| 6  | -8.385  | 0.74    | 1.62588 | 35.70   |         | THIRD LENS |
| 7  | 27.588  | 3.93    | 1.69680 | 55.53   |         | FOURTH LENS |
| 8  | -11.477 | 0.90    |         |         |         |         |
| 9  | 58.577  | 2.97    | 1.62041 | 60.29   |         | FIFTH LENS |
| 10 | -27.089 | A       |         |         |         |         |
| 11 | 134.946 | 2.15    | 1.80518 | 25.42   |         | SIXTH LENS |
| 12 | 17.795  | 5.71    |         |         |         |         |
| 13 | 24.875  | 2.98    | 1.96300 | 24.11   |         | SEVENTH LENS |
| 14 | 146.638 | 12.14207|         |         |         |         |
| 15 | 0.000   | 0.75    | 1.51633 | 64.14   |         | COMPONENT SUCH AS FILTER |
| 16 | 0.000   | BF      |         |         |         |         |

FIG. 34

| WD | INFINITY | 0.25m | 0.10m |
|----|----------|-------|-------|
| A  | 2.000    | 5.449 | 11.000 |

FIG. 35

| | |
|---|---|
| dL31-L32/L3g | 0.53 |
| nd | 1.61800 |
| $\nu$ d | 63.33 |
| $\theta_{g,F}$ | 0.5441 |
| $\theta_{g,F}-(-0.001742 \times \nu dn+0.6490)$ | 0.0054 |
| $\nu$ dn | 64.14 |
| $\nu$ dn-$\nu$ dp | 0.81 |
| f1g2g/f | 0.83 |
| (RL11a-RL12b)/(RL11a+RL21a) | 0.44 |
| fL11/fL12 | -0.75 |
| (RL12b-RL21a/(RL12b+RL21a) | -0.05 |
| (RL22b-RL21a)/(RL22b+RL21a) | 0.16 |
| (RL23b-RL21a)/(RL23b+RL21a) | 0.53 |

FIG. 36

| | R | D | Nd | $\nu$d | $\theta_{g,F}$ | REMARKS |
|---|---|---|---|---|---|---|
| 1 | 21.114 | 7.50 | 1.61800 | 63.33 | 0.5441 | FIRST LENS |
| 2 | 163.100 | 0.10 | | | | |
| 3 | 13.078 | 3.57 | 1.48749 | 70.24 | | SECOND LENS |
| 4 | 7.874 | 6.55 | | | | |
| 5 | 0.000 | 2.93 | | | | STOP |
| 6 | −7.636 | 0.70 | 1.69895 | 30.13 | | THIRD LENS |
| 7 | −139.604 | 2.84 | 1.80400 | 46.53 | | FOURTH LENS |
| 8 | −9.958 | 0.10 | | | | |
| 9 | 66.127 | 2.18 | 1.65160 | 58.55 | | FIFTH LENS |
| 10 | −29.610 | A | | | | |
| 11 | 98.183 | 1.14 | 1.74077 | 27.79 | | SIXTH LENS |
| 12 | 17.409 | 6.77 | | | | |
| 13 | 28.628 | 2.48 | 1.90366 | 31.34 | | SEVENTH LENS |
| 14 | −61.911 | 12.01748 | | | | |
| 15 | 0.000 | 0.75 | 1.51633 | 64.14 | | COMPONENT SUCH AS FILTER |
| 16 | 0.000 | BF | | | | |

FIG. 37

| WD | INFINITY | 0.25m | 0.10m |
|---|---|---|---|
| A | 4.340 | 7.820 | 13.350 |

FIG. 38

| | |
|---|---|
| dL31−L32/L3g | 0.65 |
| nd | 1.61800 |
| $\nu$d | 63.33 |
| $\theta_{g,F}$ | 0.5441 |
| $\theta_{g,F}$−(−0.001742× $\nu$dn+0.6490) | 0.0054 |
| $\nu$dn | 70.24 |
| $\nu$dn−$\nu$dp | 6.91 |
| f1g2g/f | 0.84 |
| (RL11a−RL12b)/(RL11a+RL12b) | 0.46 |
| fL11/fL12 | −0.75 |
| (RL12b−RL21a)/(RL12b+RL21a) | 0.02 |
| (RL22b−RL21a)/(RL22b+RL21a) | 0.13 |
| (RL23b−RL21a)/(RL23b+RL21a) | 0.59 |

FIG. 39

|    | R        | D        | Nd      | $\nu$ d | $\theta_{g,F}$ | REMARKS |
|----|----------|----------|---------|---------|--------|---------|
| 1  | 19.312   | 7.50     | 1.61800 | 63.33   | 0.5441 | FIRST LENS |
| 2  | 137.096  | 0.10     |         |         |        |         |
| 3  | 12.655   | 3.23     | 1.51633 | 64.14   |        | SECOND LENS |
| 4  | 7.671    | 5.87     |         |         |        |         |
| 5  | 0.000    | 2.83     |         |         |        | STOP    |
| 6  | −7.847   | 0.70     | 1.69895 | 30.13   |        | THIRD LENS |
| 7  | 127.440  | 3.38     | 1.80400 | 46.53   |        | FOURTH LENS |
| 8  | −10.635  | 0.10     |         |         |        |         |
| 9  | 68.895   | 3.69     | 1.65160 | 58.55   |        | FIFTH LENS |
| 10 | −28.857  | A        |         |         |        |         |
| 11 | 426.882  | 3.90     | 1.85026 | 32.27   |        | SIXTH LENS |
| 12 | 18.112   | 5.58     |         |         |        |         |
| 13 | 26.010   | 1.99     | 1.90366 | 31.34   |        | SEVENTH LENS |
| 14 | −213.445 | 12.00683 |         |         |        |         |
| 15 | 0.000    | 0.75     | 1.51633 | 64.14   |        | COMPONENT SUCH AS FILTER |
| 16 | 0.000    | BF       |         |         |        |         |

FIG. 40

| WD | INFINITY | 0.25m | 0.10m |
|----|----------|-------|-------|
| A  | 2.00     | 5.473 | 10.993 |

FIG. 41

| | |
|---|---|
| dL31−L32/L3g | 0.49 |
| nd | 1.61800 |
| $\nu$ d | 63.33 |
| $\theta_{g,F}$ | 0.5441 |
| $\theta_{g,F}$−(−0.001742 × $\nu$ dn+0.6490) | 0.0054 |
| $\nu$ dn | 64.14 |
| $\nu$ dn−$\nu$ dp | 0.81 |
| f1g2g/f | 0.84 |
| (RL11a−RL12b)/(RL11a+RL12b) | 0.43 |
| fL11/fL12 | −0.73 |
| (RL12b−RL21a)/(RL12b+RL21a) | −0.01 |
| (RL22b−RL21a)/(RL22b+RL21a) | 0.15 |
| (RL23b−RL21a)/(RL23b+RL21a) | 0.57 |

FIG. 42

|    | R        | D        | Nd      | νd    | θ g,F  | REMARKS                  |
|----|----------|----------|---------|-------|--------|--------------------------|
| 1  | 18.723   | 5.00     | 1.61800 | 63.33 | 0.5441 | FIRST LENS               |
| 2  | 115.189  | 0.15     |         |       |        |                          |
| 3  | 13.265   | 4.00     | 1.51633 | 64.14 |        | SECOND LENS              |
| 4  | 7.769    | 6.36     |         |       |        |                          |
| 5  | 0.000    | 2.85     |         |       |        | STOP                     |
| 6  | −7.883   | 0.73     | 1.68893 | 31.07 |        | THIRD LENS               |
| 7  | −276.080 | 3.25     | 1.77250 | 49.60 |        | FOURTH LENS              |
| 8  | −10.293  | 0.30     |         |       |        |                          |
| 9  | 48.452   | 3.81     | 1.62041 | 60.29 |        | FIFTH LENS               |
| 10 | −31.814  | A        |         |       |        |                          |
| 11 | 241.919  | 3.10     | 1.80518 | 25.42 |        | SIXTH LENS               |
| 12 | 17.919   | 5.67     |         |       |        |                          |
| 13 | 26.211   | 1.74     | 1.96300 | 24.11 |        | SEVENTH LENS             |
| 14 | 679.385  | 12.05136 |         |       |        |                          |
| 15 | 0.000    | 0.75     | 1.51633 | 64.14 |        | COMPONENT SUCH AS FILTER |
| 16 | 0.000    | BF       |         |       |        |                          |

FIG. 43

| WD | INFINITY | 0.25m | 0.10m  |
|----|----------|-------|--------|
| A  | 2.00     | 5.468 | 11.012 |

FIG. 44

| dL31−L32/L3g                            | 0.54    |
| nd                                      | 1.61800 |
| νd                                      | 63.33   |
| θ g,F                                   | 0.5441  |
| θ g,F−(−0.001742 × ν dn+0.6490)         | 0.0054  |
| ν dn                                    | 64.14   |
| ν dn−ν dp                               | 0.81    |
| f1g2g/f                                 | 0.84    |
| (RL11a−RL12b)/(RL11a+RL12b)             | 0.41    |
| fL11/fL12                               | −0.73   |
| (RL12b−RL21a/(RL12b+RL21a)              | −0.01   |
| (RL22b−RL21a)/(RL22b+RL21a)             | 0.13    |
| (RL23b−RL21a)/(RL23b+RL21a)             | 0.60    |

FIG. 45

| | R | D | Nd | νd | θ$_{g,F}$ | REMARKS |
|---|---|---|---|---|---|---|
| 1 | 19.658 | 4.34 | 1.61800 | 63.33 | 0.5441 | FIRST LENS |
| 2 | 150.146 | 0.15 | | | | |
| 3 | 13.683 | 4.95 | 1.51633 | 64.14 | | SECOND LENS |
| 4 | 7.857 | 4.74 | | | | |
| 5 | 0.000 | 2.61 | | | | STOP |
| 6 | −9.227 | 0.71 | 1.64769 | 33.79 | | THIRD LENS |
| 7 | 13.226 | 3.97 | 1.67003 | 47.23 | | FOURTH LENS |
| 8 | −12.523 | 0.10 | | | | |
| 9 | 56.447 | 2.27 | 1.60300 | 65.44 | | FIFTH LENS |
| 10 | −26.383 | 4.53 | 2.00069 | 25.46 | | SIXTH LENS |
| 11 | −26.058 | A | | | | |
| 12 | 38.573 | 2.78 | 1.80518 | 25.42 | | SEVENTH LENS |
| 13 | 15.330 | 3.54 | | | | |
| 14 | 20.627 | 1.78 | 1.96300 | 24.11 | | EIGHTH LENS |
| 15 | 42.036 | 12.38 | | | | |
| 16 | 0.000 | 0.75 | 1.51633 | 64.14 | | COMPONENT SUCH AS FILTER |
| 17 | 0.000 | BF | | | | |

FIG. 46

| WD | INFINITY | 0.25m | 0.10m |
|---|---|---|---|
| A | 2.00 | 6.072 | 12.773 |

FIG. 47

| | |
|---|---|
| dL31−L32/L3g | 0.44 |
| nd | 1.61800 |
| νd | 63.33 |
| θ$_{g,F}$ | 0.5441 |
| θ$_{g,F}$−(−0.001742 × νdn+0.6490) | 0.0054 |
| νdn | 64.14 |
| νdn−νdp | 0.81 |
| f1g2g/f | 0.90 |
| (RL11a−RL12b)/(RL11a+RL12b) | 0.43 |
| fL11/fL12 | −0.72 |
| (RL12b−RL21a/(RL12b+RL21a) | −0.08 |

FIG. 48

| | R | D | Nd | $\nu$ d | $\theta_{g,F}$ | REMARKS |
|---|---|---|---|---|---|---|
| 1 | 22.799 | 5.00 | 1.61800 | 63.33 | 0.5441 | FIRST LENS |
| 2 | 486.662 | 0.15 | | | | |
| 3 | 12.495 | 4.65 | 1.51633 | 64.14 | | SECOND LENS |
| 4 | 7.869 | 5.24 | | | | |
| 5 | 0.000 | 2.69 | | | | STOP |
| 6 | −8.833 | 0.70 | 1.78470 | 26.29 | | THIRD LENS |
| 7 | 18.896 | 3.81 | 1.85026 | 32.27 | | FOURTH LENS |
| 8 | −12.212 | 0.10 | | | | |
| 9 | 55.312 | 2.02 | 1.60300 | 65.44 | | FIFTH LENS |
| 10 | −20.728 | 1.19 | | | | |
| 11 | −15.349 | 1.20 | 1.69895 | 30.13 | | SIXTH LENS |
| 12 | −18.201 | A | | | | |
| 13 | 184.837 | 1.04 | 1.80518 | 25.42 | | SEVENTH LENS |
| 14 | 17.845 | 5.83 | | | | |
| 15 | 26.034 | 1.66 | 1.96300 | 24.11 | | EIGHTH LENS |
| 16 | 352.348 | 12.07 | | | | |
| 17 | 0.000 | 0.75 | 1.51633 | 64.14 | | COMPONENT SUCH AS FILTER |
| 18 | 0.000 | BF | | | | |

FIG. 49

| WD | INFINITY | 0.25m | 0.10m |
|---|---|---|---|
| A | 2.00 | 5.428 | 11.013 |

FIG. 50

| | |
|---|---|
| dL31−L32/L3g | 0.68 |
| nd | 1.61800 |
| $\nu$ d | 63.33 |
| $\theta_{g,F}$ | 0.5441 |
| $\theta_{g,F}$−(−0.001742 × $\nu$ dn+0.6490) | 0.0054 |
| $\nu$ dn | 64.14 |
| $\nu$ dn−$\nu$ dp | 0.81 |
| f1g2g/f | 0.83 |
| (RL11a−RL12b)/(RL11a+RL12b) | 0.49 |
| fL11/fL12 | −0.62 |
| (RL12b−RL21a/(RL12b+RL21a) | −0.06 |

IMAGING LENS SYSTEM AND IMAGING DEVICE

CROSS-REFERENCE TO RELATED APPLICATION

This patent application is based on and claims priority pursuant to 35 U.S.C. § 119(a) to Japanese Patent Application No. 2018-115980, filed on Jun. 19, 2018, in the Japan Patent Office, the entire disclosure of which is hereby incorporated by reference herein.

BACKGROUND

Technical Field

Embodiments of the present disclosure relate to an imaging lens system and an imaging device incorporating the imaging lens system.

Background Art

Imaging devices equipped with area sensors are widely known as cameras for shooting an object such as compact cameras, single-lens cameras, and mirrorless cameras. In recent years, such imaging apparatuses are also used as industrial cameras, on-vehicle cameras, and surveillance cameras.

Imaging lens systems used in such imaging devices need to have stable performance with little deterioration due to a focusing operation.

SUMMARY

In one aspect of this disclosure, there is provided an imaging lens system including a first lens group having positive refractive power; a stop; a second lens group having positive refractive power; and a third lens group having one of positive refractive power and negative refractive power, disposed in that order from an object side to an image side. The first lens group includes a first-group-first positive lens and a first-group-second negative lens, disposed in that order from the object side to the image side. The third lens group includes a third-group-first negative lens and a third-group-second positive lens, disposed in that order from the object side to the image side. A combination of the first lens group and the second lens group moves together as a single unit to the object side in focusing from infinity to a close distance to increase a distance between the second lens group and the third lens group. Conditional expression (1) below is satisfied:

$$0.40 < dL31-L32/L3g < 0.75 \qquad (1)$$

where $dL31-L32$ denotes air spacing between the third-group-first negative lens and the third-group-second positive lens in the third lens group, and $L3g$ denotes a distance along the optical axis between an object-side surface of the third-group-first negative lens and an image-side surface of the third-group-second positive lens.

In another aspect of this disclosure, there is provided an improved imaging device including the above-described imaging lens system.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIGS. 30 to 50 are Tables 1 to 21 indicating data regarding the imaging lens system according to the first example to the seventh example.

Figure 1A:
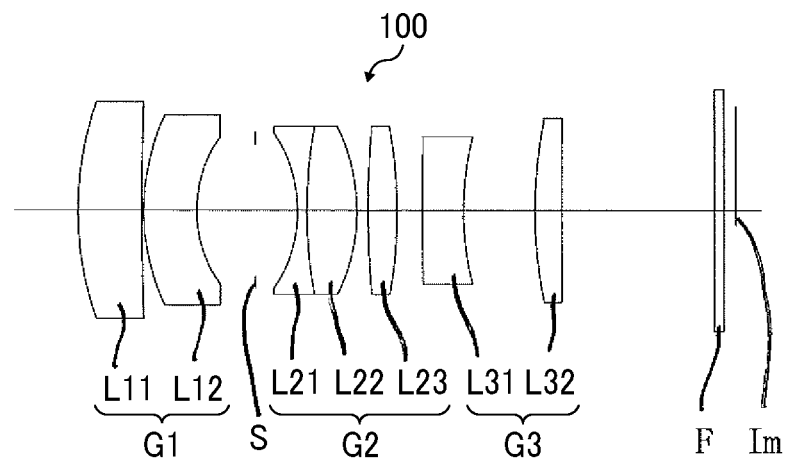
FIGS. 1A, 1B, and 1C (FIG. 1) are cross-sectional views of an imaging lens systems according to a first example of the present disclosure.
Figure 1B:
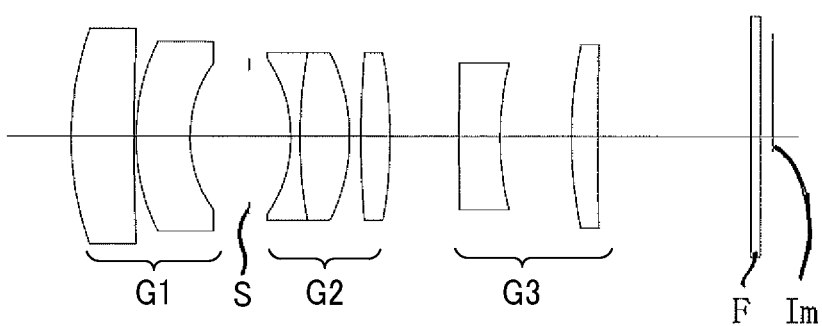
Figure 1C:
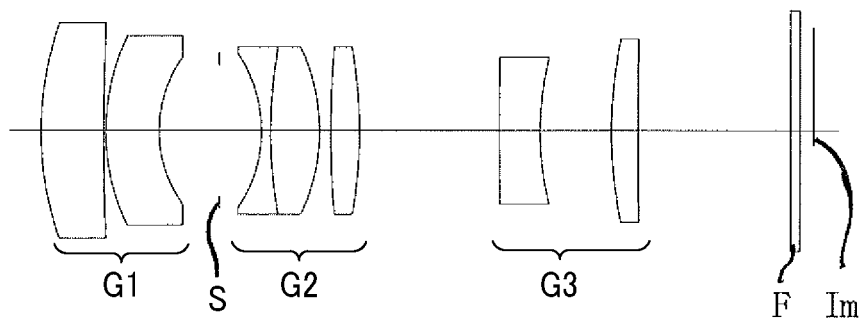
Figure 2A:
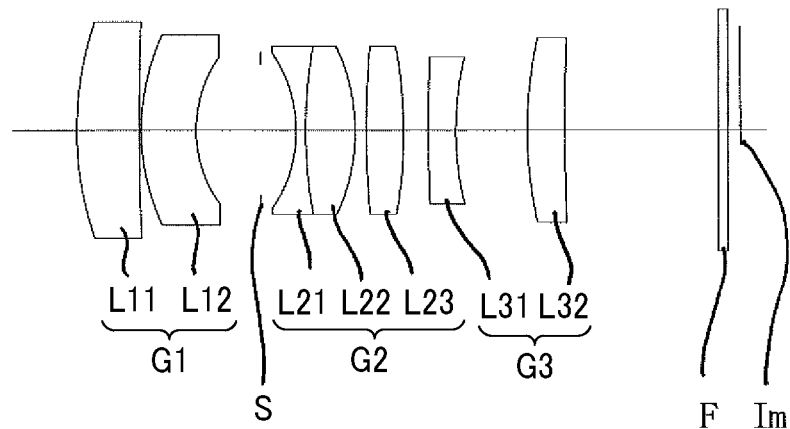
FIGS. 2A, 2B, and 2C (FIG. 2) are cross-sectional views of an imaging lens systems according to a second example of the present disclosure.
Figure 2B:
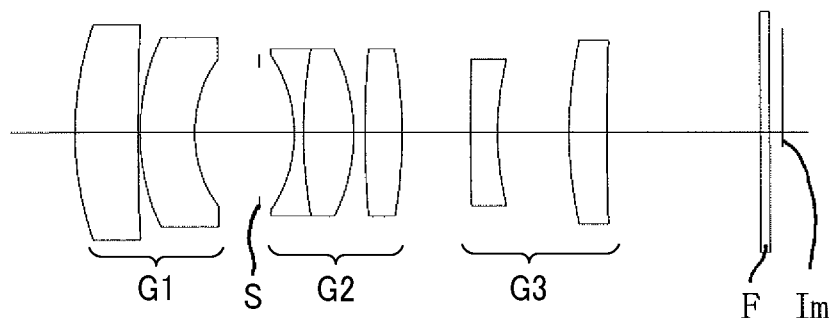
Figure 2C:
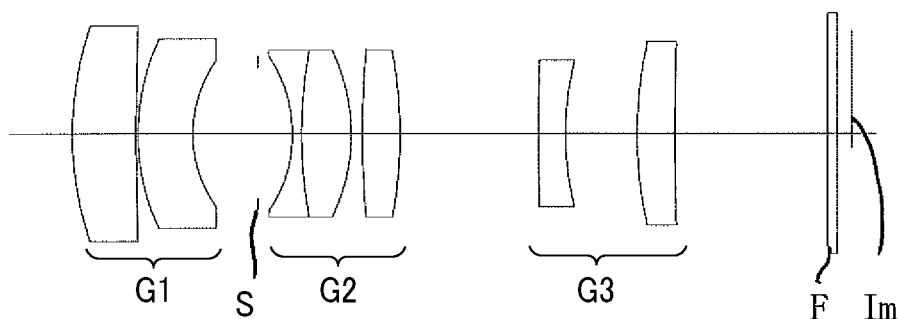
Figure 3A:
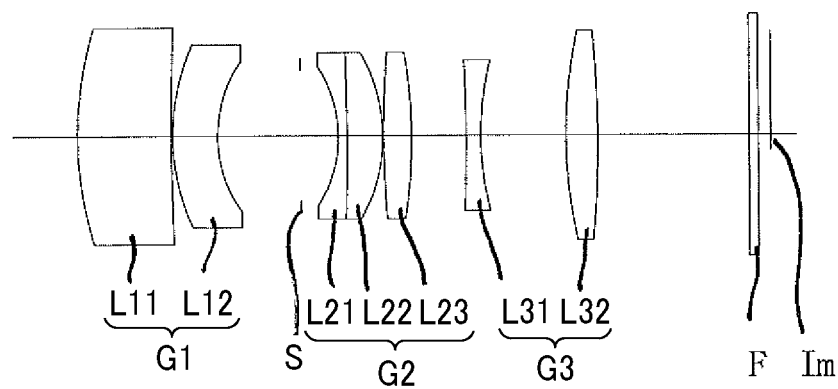
FIGS. 3A, 3B, and 3C (FIG. 3) are cross-sectional views of an imaging lens systems according to a third example of the present disclosure.
Figure 3B:
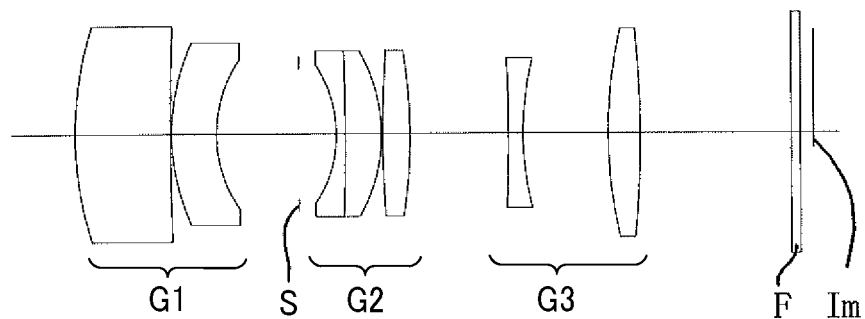
Figure 3C:
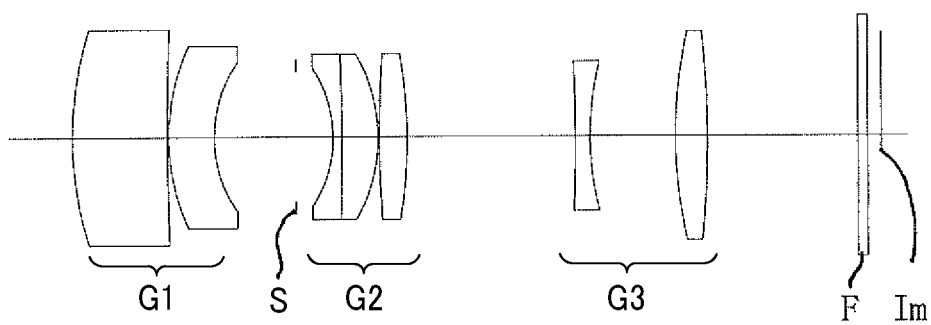
Figure 4A:
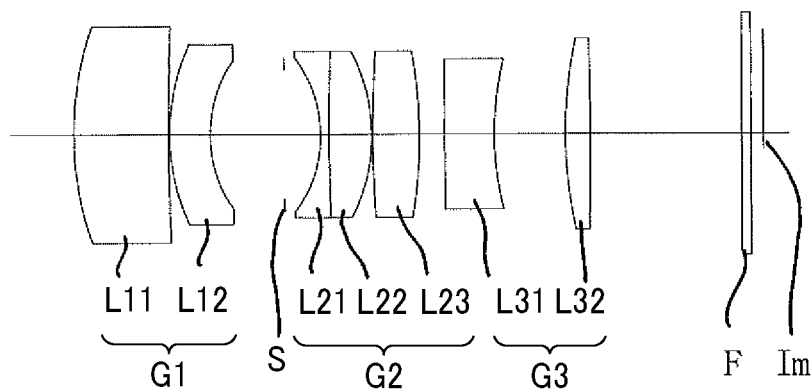
FIGS. 4A, 4B, and 4C (FIG. 4) are cross-sectional views of an imaging lens systems according to a fourth example of the present disclosure.
Figure 4B:
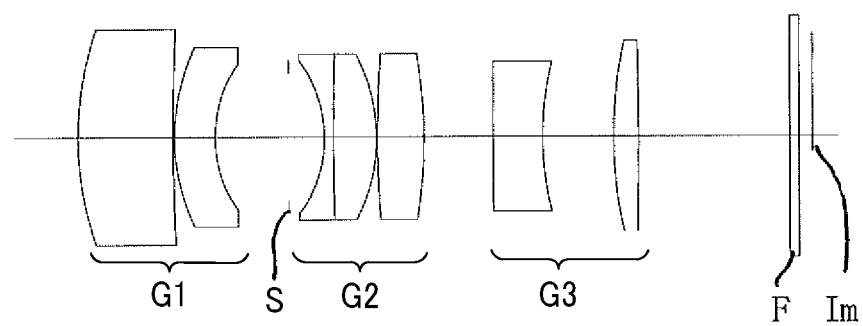
Figure 4C:
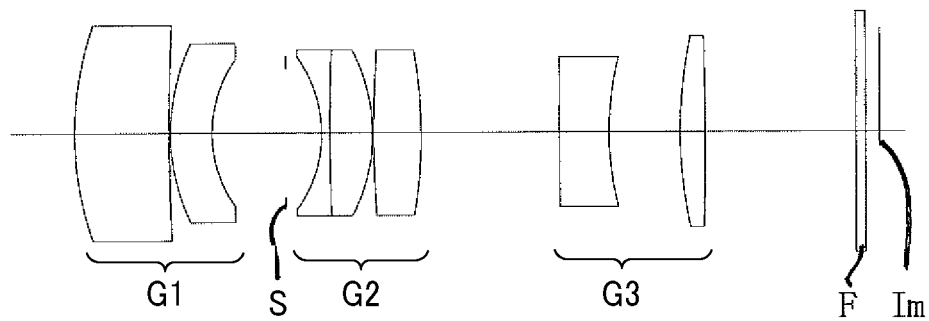
Figure 5A:
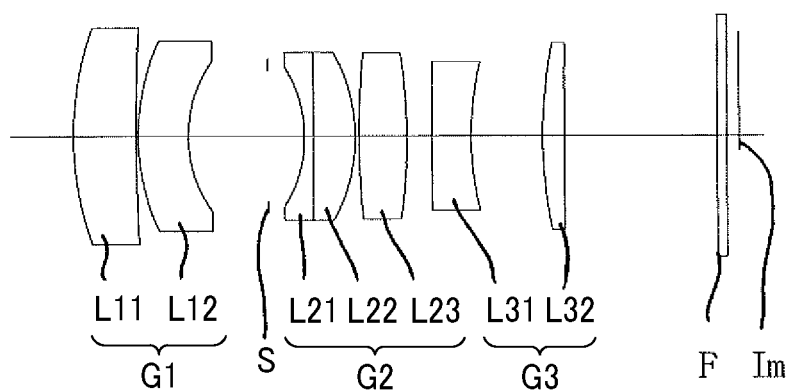
FIGS. 5A, 5B, and 5C (FIG. 5) are cross-sectional views of an imaging lens systems according to a fifth example of the present disclosure.
Figure 5B:
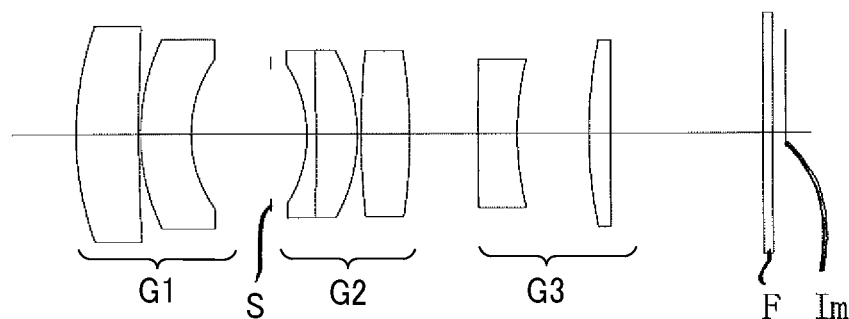
Figure 5C:
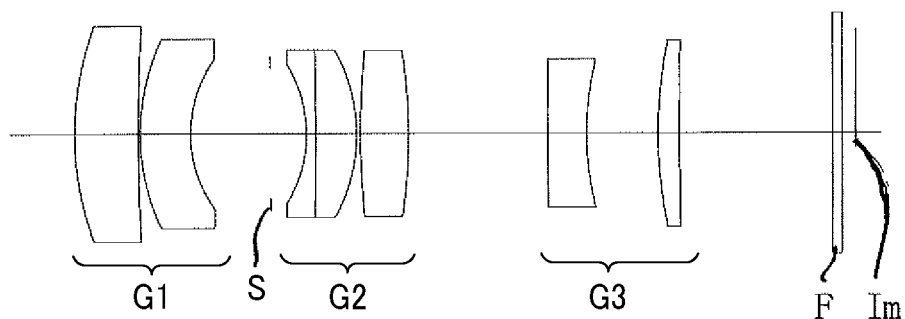
Figure 6A:
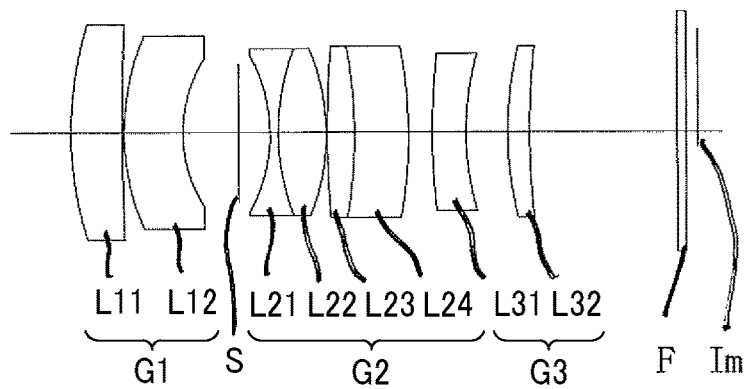
FIGS. 6A, 6B, and 6C (FIG. 6) are cross-sectional views of an imaging lens systems according to a sixth example of the present disclosure.
Figure 6B:
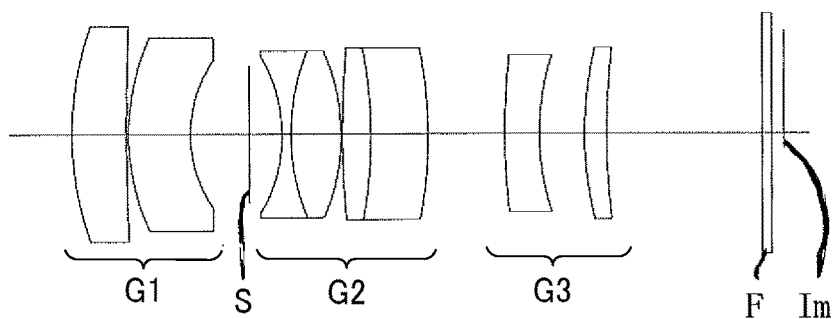
Figure 6C:
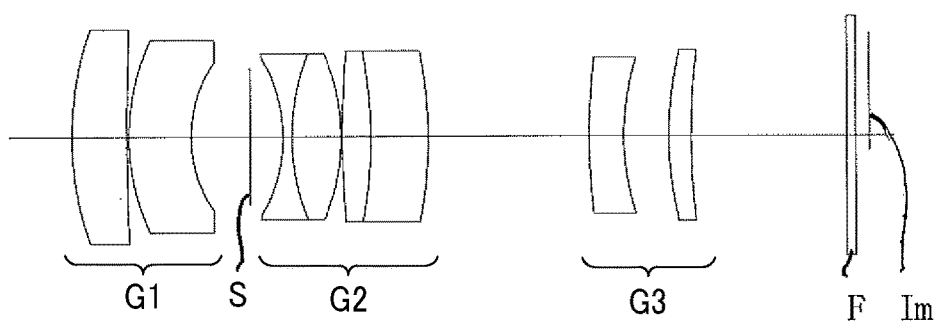
Figure 7A:
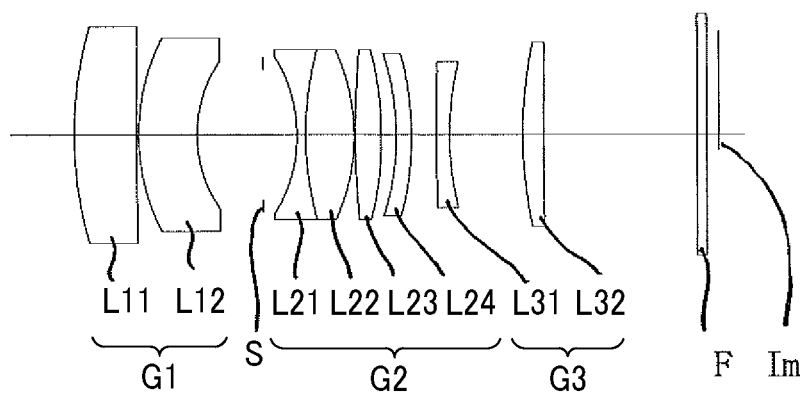
FIGS. 7A, 7B, and 7C (FIG. 7) are cross-sectional views of an imaging lens systems according to a seventh example of the present disclosure.
Figure 7B:
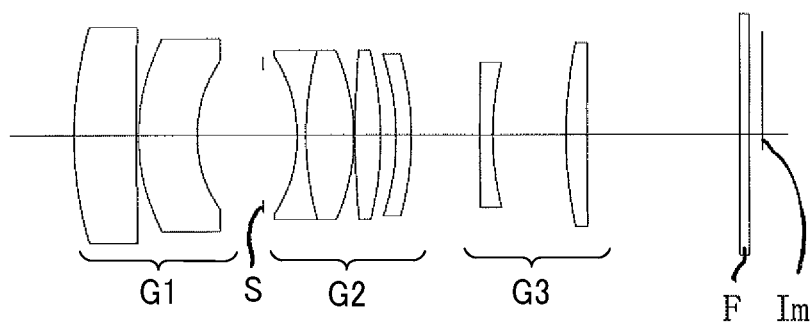
Figure 7C:
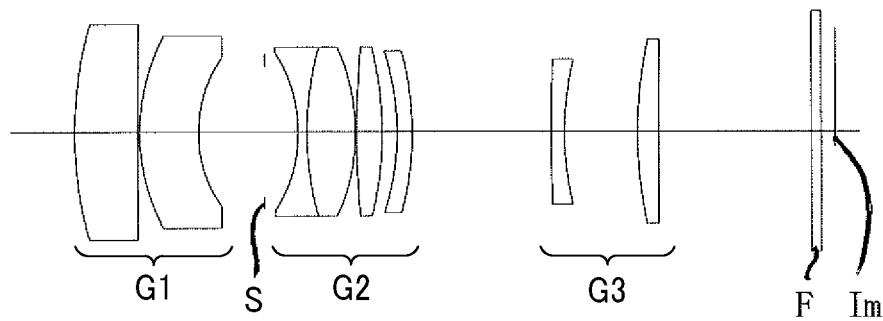

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

Embodiments of the present disclosure are described in detail with reference to the drawings. Like reference numerals designate identical or corresponding components throughout the several views and a description of same is omitted.

Hereinafter, the embodiments of the present disclosure are described.

FIGS. 1 to 7 are illustrations of an imaging lens system 100 according to a first example to a seventh example.

The imaging lens systems 100 according to the embodiments of the present disclosure in FIGS. 1 to 7 are assumed to be an imaging lens system used for machine vision such as a product inspection device, which is an example of industrial cameras.

In FIGS. 1 to 7, the left side is an object side, and the right side is an image side.

Each of FIGS. 1A, 2A, 3A, 4A, 5A, 6A, and 7A (the first illustration in each figure) is an illustration of an arrangement of an imaging lens system 100 focused at infinity. Each of FIGS. 1B, 2B, 3B, 4B, 5B, 6B, and 7B (the second illustration in each figure) is an illustration of an arrangement of an imaging lens system 100 focused at a long distance. Each of FIGS. 1C, 2C, 3C, 4C, 5C, 6C, and 7C (the third illustration in each figure) is an illustration of an arrangement of an imaging lens system 100 focused at a short distance.

In order to avoid complexity, the symbols are common in FIGS. 1 to 7.

In FIGS. 1 to 7, a first lens group G1, a second lens group G2, and the third lens group G3 are illustrated in common. Further, a stop S and an imaging plane Im on the image side relative to the third lens group G3 are also illustrated in common in FIGS. 1 to 7.

An imaging device 20 (to be described below) equipped with the imaging lens system 100 is assumed to include an area sensor such as a charge-coupled device (CCD) area sensor, a metal oxide semiconductor (MOS) sensor, and a complementary metal oxide semiconductor (CMOS) sensor. The area sensor forms an image of an object captured by the imaging lens system 100 on a photo-sensing surface that matches the imaging plane Im. Further, a filter F is disposed on the object side relative to the imaging plane Im in FIGS. 1 to 7. Examples of the filter F include a cover glass of the area sensor and various types of filters. The filter F is a transparent plate equivalent to any of these components.

Each of the first lens group G1 and the third lens group G3 includes two lenses, and the second lens group G2 includes three lenses (FIGS. 1 to 5) or four lenses (FIGS. 6 and 7).

The two lenses constituting the first lens group G1 are a positive lens L11 (a first-group-first positive lens) and a negative lens L12 (a first-group-second negative lens), disposed in that order from the object side. The two lenses constituting the third lens group G3 are a negative lens L31 (a third-group-first negative lens) and a positive lens L32 (a third-group-second positive lens), disposed in that order from the object side.

Similarly, the three or four lenses constituting the second lens group G2 are a lens L21 (a second-group-first lens), a lens L22 (a second-group-second lens), a lens L23 (a second-group-third lens), and a lens L24 (a second-group-fourth lens), disposed in that order from the object side.

The first lens group G1 and the second lens group G2 both have positive refractive power, and the third lens group G3 has positive or negative refractive power. In the first to fifth examples of FIGS. 1 to 5, the second lens group G2 includes one negative lens (the lens L21) and two positive lenses (the lens L22 and lens L23).

In the sixth example of FIG. 6, the second lens group G2 includes one negative lens (the lens L21) and three positive lenses (the lens L22, lens L23, and lens L24). In the seventh example of FIG. 7, the second lens group G2 includes two negative lenses (the lens L21 and the lens L24) and two positive lenses (the lens L22 and the lens L23).

In other words, each imaging lens system 100 according to the first example to the seventh example includes the first lens group G1 having positive refractive power, the stop S, the second lens group G2 having positive refractive power, and the third lens group G3 having positive or negative refractive power.

In changing the focus from infinity to a close distance, a combination of the first lens group G1, the stop S, and the second lens group G2 moves together as a single unit to the object side so as to increase the distance to the third lens group G3.

The first lens group G1 includes the positive lens L11 and the negative lens L12, disposed in that order from the object side to the image side. The third lens group G3 includes the negative lens L31 and the positive lens L32, disposed in that order from the object side to the image side.

When dL31–L32 denotes air spacing between the negative lens L31 and the positive lens L32 in the third lens group G3 and L3g denotes a distance along the optical axis between an object-side surface of the negative lens L31 and an image-side surface of the positive lens L32, conditional expression (1) below is satisfied:

$$0.40 < dL31\text{-}L32/L3g < 0.75 \tag{1}$$

As described above, in the imaging lens system 100 according to the embodiments of the present disclosure, the first lens group G1 has a two-lens configuration of positive and negative lenses. This arrangement substantially prevents an increase in the sizes of the lenses constituting the first lens group G1, which further reduces the cost.

Further, such a configuration enables spherical aberration to be cancelled out by the object-side lens surface of the positive lens L11 and the image-side lens surface of the negative lens L12, so as to achieve a successful aberration correction.

Similarly, the third lens group G3 also has a two-lens configuration of the negative lens L31 and the positive lens L32. This arrangement also substantially prevents an increase in the sizes of the lenses constituting the third lens group G3, which further reduces the cost. Particularly, such a configuration enables field curvature to be cancelled out by the image-side lens surface of the negative lens L31 and the object-side lens surface of the positive lens L32, so as to achieve a successful aberration correction.

The conditional expression (1) defines the ratio of the distance (air spacing) (dL31–L32) between the positive lens L32 and the negative lens L31 of the third lens group G3 to the distance (L3g) along the optical axis between the object-side surface of the negative lens L31 and the image-side surface of the positive lens L32.

The two lenses constituting the third lens group G3 serve to successfully correct residual aberration generated in the first lens group G1 and the second lens group G2 over the entire capturing distance.

The conditional expression (1) allows each aberration, particularly field curvature to be successfully reduced or eliminated.

When the value of dL31–L32/L3g exceeds the upper limit of the conditional expression (1), the ratio of the air spacing between the negative lens L31 and the positive lens L32 of the third lens group G3 with respect to the total length of the third lens group G3 becomes too large. As a result, the filed curvature becomes difficult to correct successfully, and reducing the size of the imaging lens system also becomes difficult.

When the value of dL31–L32/L3g falls below the lower limit of the conditional expression (1), the ratio of the air spacing between the negative lens L31 and the positive lens L32 of the third lens group G3 with respect to the total length of the third lens group G3 becomes too small. This leads to an insufficient correction of the residual aberration, and thus it becomes difficult to substantially prevent changes in aberration levels due to a focusing operation (a change in the focus).

Moreover, the field curvature tends to be inclined toward the over side (over correction) relative to the imaging plane.

The above-described configuration of the imaging lens system 100 according to the first example is referred to as a first configuration.

The imaging lens system 100 of the first configuration satisfies the following conditional expressions (2) to (4):

$$1.50 < nd < 1.63 \tag{2}$$

$$62.0 < vd < 78.0 \tag{3}$$

$$0.004 < \theta_{g,F} - (-0.001742 \times vd + 0.6490) < 0.030 \tag{4}$$

The conditional expressions (2) to (4) define the material of the positive lens L11 in the first lens group G1 where nd denotes a refractive index with respect to d-line, vd denotes the Abbe number of the material of the positive lens L11, and $\theta_{g,F}$ denotes a partial dispersion ratio of the material of the positive lens L11 in the first lens group G1.

The partial dispersion ratio $\theta_{g,F}$ is a ratio of (ng–nF) to (nF–nC)($\theta_{g,F}$=(ng–nF)/(nF–nC)) where ng denotes a refractive index with respect to g-line, nF denotes a refractive index of the lens material with respect to F-line, and nC denotes a refractive index with respect to C-line.

A configuration that satisfies the conditional expressions (2) to (4) is referred to as a second configuration.

The imaging lens system of the first configuration or the second configuration satisfies the following conditional expressions (5) and (6):

$$55.0 < vdn < 95.0 \tag{5}$$

$$-5.0 < vdn - vdp < 15.0 \tag{6}$$

The conditional expressions (5) and (6) define the Abbe numbers of the materials of the positive lens L11 and the negative lens L12 constituting the first lens group G1 where vdp denotes the Abbe number of the material of the positive lens L11 with respect to the d-line, and vdn denotes the Abbe number of the material of the negative lens L12 with respect to the d-line.

A configuration that satisfies the conditional expressions (5) and (6) is referred to as a third configuration.

The imaging lens system 100 of any one of the first configuration to the third configuration satisfies the following conditional expression (7):

$$0.70 < f1g2g/f < 0.95 \tag{7}$$

In the conditional expression (7), f denotes the focal length of the entirety of the imaging lens system 100 focused at infinity, and f1g2g denotes a combined focal length of the first lens group G1 and the second lens group G2.

A configuration that satisfies the condition (7) is referred to as a fourth configuration.

The imaging lens system 100 of any one of the first configuration to the fourth configuration satisfies the following conditional expression (8):

$$0.35 < (RL11a - RL12b)/(RL11a + RL12b) < 0.55 \tag{8}$$

The conditional expression (8) relates to the shapes of two lenses constituting the first lens group G1 where RL11a denotes the radius of curvature of the object-side surface of the positive lens L11 and RL12b denotes the radius of curvature of the image-side surface of the negative lens L12.

A configuration that satisfies the conditional expression (8) is referred to as a fifth configuration.

The imaging lens system 100 of any one of the first configuration to the fifth configuration satisfies the following conditional expression (9):

$$-0.80 \le fL11/fL12 < -0.60 \tag{9}$$

The conditional expression (9) defines the relation of refractive power between the two lenses (the positive lens L11 and the negative lens L12) constituting the first lens group G1 where fL11 denotes the focal length of the positive lens L11, and fL12 denotes the focal length of the negative lens L12.

A configuration that satisfies the conditional expression (9) is referred to as a sixth configuration.

The imaging lens system 100 of any one of the first configuration to the sixth configuration satisfies the following conditional expression (10):

$$-0.10<(RL12b+RL21a)/(RL12b-RL21a)<0.10 \quad (10)$$

The conditional expression (10) defines the relation between the negative lens L12 (the image-side lens of the first lens group G1) and the lens L21 (the lens closest to the object within the second lens group G2) where RL12b denotes the radius of curvature of the image-side surface of the negative lens L12 and RL21a denotes the radius of curvature of the object-side surface of the lens L21.

A configuration that satisfies the conditional expression (10) is referred to as a seventh configuration 7.

Hereinafter, the conditional expressions (2) to (4) for the configuration 2 are collectively referred to as a condition group A, and the conditional expressions (5) and (6) are collectively referred to as a condition group B.

The imaging lens system 100 according to the embodiments of the present disclosure satisfies the conditional expression (1) and the condition group A, and also satisfies the conditional expression (1) and the condition group B. Further, in some embodiments, the imaging lens system 100 satisfies all the condition (1), the condition group A, and the condition group B.

Further, in some embodiments, the imaging lens system 100 satisfies the conditional expression (1) and any one of the conditional expressions (7) to (10). In some other embodiments, the imaging lens system 100 satisfies any one of a combination of the conditional expression (1) and the condition group A, a combination of the conditional expression (1) and the condition group B, and a combination of the conditional expression (1) and any one of the condition group A and the condition group B, together with any one or more of the conditional expressions (7) to (10).

In the above-described imaging lens systems 100 of the first configurations to the seventh configuration, the third lens group G3 may be fixedly mounted on the imaging plane Im during a change in the focus from infinity to the point at a close distance. This configuration is referred to as an eighth configuration.

In the imaging lens system 100 of any one of the first configuration to the eighth configuration, the second lens group G2 includes three lenses: a negative lens L21, a positive lens L22, and a positive lens L23, disposed in that order from the object side to the image side. This configuration is referred to as a ninth configuration.

The imaging lens system 100 of the ninth configuration satisfies the following conditional expression (11):

$$0.05<(RL22b-RL21a)/(RL22b+RL21a)<0.22 \quad (11)$$

The conditional expression (11) relates to a combination of two lenses (the negative lens L21 and the positive lens L22, which are disposed closer to the object) among the three lenses (the negative lens L21, the positive lens L22, and the positive lens L23) constituting the second lens group G2 where RL22b denotes a radius of curvature of the image-side surface of the positive lens L22, and RL21a denotes a radius of curvature of the object-side surface of the negative lens L21.

The configuration satisfying the conditional expression (11) is referred to as a tenth configuration.

The imaging lens system 100 of the ninth configuration or the tenth configuration satisfies the following conditional expression (12).

$$0.35<(RL23b-RL21a)/(RL23b+RL21a)<0.70 \quad (12)$$

The conditional expression (12) relates to a combination of the negative lens L21 closest to the object and the positive lens L23 closest to the image among the three lenses (the negative lens L21, the positive lens L22, and the positive lens L23) constituting the second lens group G2 where RL23b denotes a radius of curvature of the image-side surface of the positive lens L23, and RL21a denotes a radius of curvature of the object-side surface of the negative lens L21.

The configuration satisfying the conditional expression (12) is referred to as a eleventh configuration.

The imaging lens system 100 of the ninth configuration satisfies any one or both of the conditional expressions (11) and (12).

In the imaging lens system 100 of any one of the first configuration to the eleventh configuration, all the lenses constituting the first lens group G1, the second lens group G2, and the third lens group G3 may be spherical lenses. This configuration is referred to as a twelfth configuration. The imaging lens system 100 of the twelfth configuration includes spherical lenses only.

In the imaging lens system 100 of any one of the first configuration to the twelfth configuration, all the lenses constituting the first lens group G1, the second lens group G2, and the third lens group G3 may be made of inorganic solid material. This configuration is referred to as a thirteenth configuration.

Note that the imaging lens system 100 according to some embodiments of the present disclosure includes one or more aspheric lenses or one or more diffractive lenses. However, the twelfth configuration including only the spherical lenses facilitates lens manufacturing, which further facilitates the manufacturing of the imaging lens system 100 of the thirteenth configuration including only the lenses made of inorganic solid material.

The lenses constituting the imaging lens system 100 of the present disclosure may include a lens made of, for example, an organic material and an organic-inorganic hybrid material. However, the lens made of an inorganic solid material according to the thirteenth configuration is insusceptible to changes in temperature and humidity, and highly resistant to changes in the environment.

The following describes the significance of the above-described conditional expressions (2) to (12).

Satisfying the condition group A, i.e., the conditional expressions (2) to (4) enables chromatic aberration to be corrected more successfully.

Typically, the axial chromatic aberration of the imaging lens system is more likely to occur as the focal length of the imaging lens system is longer. However, the lens material satisfying the conditional expressions (2) to (4) has a high anomalous dispersion and a low dispersion, and the positive lens L11 (in the first lens group G1) made of such material can substantially prevent the occurrence of the chromatic aberration even when the focal length of the imaging lens system 100 as a whole increases.

In particular, by using a kind of glass having the anomalous dispersion for the positive lens L11 in which the axial marginal rays pass a high position, the secondary spectrum of chromatic aberration is effectively corrected, and thus occurrence of the axial chromatic aberration is sufficiently prevented although a small number of lenses, i.e., two lenses, are disposed on the object side relative to the stop S.

When the value of nd falls below the lower limit of the conditional expression (2), the correction of the monochromatic aberration tends to be insufficient. When the value of vd falls below the lower limit of the conditional expression (3), the correction of the chromatic aberration tends to be insufficient. When the value of $\theta_{g,F}-(-0.001742 \times vd+0.6490)$ falls below the lower limit of the conditional expression (4), the correction of the secondary spectrum of the chromatic aberration tends to be insufficient.

There is no optical material that exceeds the upper limit for all of the conditional expressions (2), (3) and (4), or it is very special and expensive if it exists, and it is not realistic.

The conditional expression (5) defines the Abbe number of the negative lens L12, and the conditional expression (6) defines the difference between the Abbe number of the negative lens L12 and the Abbe number of the positive lens L11.

By making the negative lens L12 (of the first lens group G1) with low-dispersion glass having a large Abbe number satisfying the conditional expression (5) and by satisfying the conditional expression (6), the occurrence of the chromatic aberration itself is substantially prevented, and the chromatic aberration is successfully corrected by the positive lens L11 and the negative lens L12 of the first lens group G1. Thus, the chromatic aberration is sufficiently corrected over the optical system as a whole.

The conditional expression (7) defines the ratio of the combined focal length flg2g of the first lens group G1 and the second lens group G2 to the focal length f of the imaging lens system 100 as a whole.

When the value of flg2g/f exceeds the upper limit of the conditional expression (7), the combined power of the first lens group G1 and the second lens group G2 becomes too small relative to the power of the imaging lens system 100 as a whole, which reduces the action of the first lens group G1 and the second lens group G2 as a focusing group. Accordingly, the mount of movement of the focusing group tends to increase.

When the value of flg2g/f falls below the lower limit of the conditional expression (7), the combined power of the first lens group G1 and the second lens group G2 becomes too large with respect to the power of the imaging lens system 100 as a whole, which causes the aberrations to easily occur in the first lens group G1 and the second lens group G2.

By satisfying the conditional expression (7), it is easier to correct the aberrations successfully, and perform focusing with a small amount of movement of the focusing group. Moreover, an increase in the sizes of the lens itself as well as the imaging lens system as a whole including a mechanism that moves the focusing group is effectively prevented.

The conditional expression (8) defines the shape formed by the object-side surface of the positive lens L11 and the image-side surface of the negative lens L12 in the first lens group G1.

As described above, the object-side surface of the positive lens L11 and the image-side surface of the negative lens L12 cancels out spherical aberration.

When the value of (RL11a−RL12b)/(RL11a+RL12b) exceeds the upper limit of the conditional expression (8), the difference in radius of curvature between the object-side surface of the positive lens L11 and the image-side surface of the negative lens L12 becomes too large, spherical aberration tends to occur on the over side (excessive correction) relative to the imaging plane Im.

When the value of (RL11a−RL12b)/(RL11a+RL12b) falls below the lower limit of the conditional expression (8), the difference in radius of curvature between the object-side surface of the positive lens L11 and the image-side surface of the negative lens L12 becomes too small, spherical aberration tends to occur on the under side (insufficient correction) relative to the imaging plane Im.

By satisfying the conditional expression (8), it is easy to successfully reduce or eliminate the spherical aberration over the entire imaging distance.

The conditional expression (9) defines the ratio of the focal length of the positive lens L11 to the focal length of the negative lens L12 in the first lens group G1.

When the value of fL11/fL12 exceeds the upper limit of the conditional expression (9), the positive power of the first lens group G1 becomes too large. When the value of fL11/fL12 falls below the lower limit of the conditional expression (9), the positive power of the first lens group G1 becomes too small. In any of the cases, the changes in aberration caused by changing focus tend to be difficult to reduce or eliminate.

By satisfying the conditional expression (9), the power is well balanced between the positive lens L11 and the negative lens L12, disposed closer to the object than the stop S, and each aberration generated in the first lens group G1 is successfully reduced or eliminated over the entire capturing distance.

The conditional expression (10) controls the shape of a negative air lens formed by the image-side surface of the lens closest to the image in the first lens group G1 and the object-side surface of the lens closest to the object in the second lens group G2, which are adjacently disposed between which the stop S is disposed.

When the value of (RL12b+RL21a)/(RL12b−RL21a) exceeds the upper limit of the conditional expression (10), the radius of curvature of the image-side surface of the negative lens L12 closest to the image in the first lens group G1 becomes too large. When the value of (RL12b+RL21a)/(RL12b−RL21a) falls below the lower limit of the conditional expression (10), the radius of curvature of the object-side surface of the negative lens L21 of the second lens group lens G2 becomes too large.

Within the range of the conditional expression (10), the power is well distributed between the concave surface on the object side and the concave surface on the image side, which are arranged with the stop S disposed therebetween. This arrangement facilitates correction of coma aberration in particular.

In the imaging lens system 100 of the eighth configuration, the third lens group G3 is fixedly mounted on the image plane Im during the focusing operation. This configuration provides a simple moving mechanism for focusing, and facilitates a reduction in the size of the entire lens including the mechanism.

In the imaging lens system 100 of the ninth configuration, the second lens group G2 includes three lenses: a negative lens L21, a positive lens L22, and a positive lens L23, which are arranged in that order from the object side to the image side. Such a lens configuration of the second lens group G2 provides a Gaussian arrangement symmetrical with respect to the stop S, and enables various aberrations generated in the focusing group to be sufficiently reduced or eliminated with a small number of lenses.

The conditional expression (11) satisfied by the image forming lens system 100 of the tenth configuration defines the shape formed by the object-side surface of the negative lens L21 and the image-side surface of the positive lens L22 in the second lens group G2.

These lens surfaces cancel out spherical aberration and coma aberration in particular. When the value of (RL22b−RL21a)/(RL22b+RL21a) exceeds the upper limit of the conditional expression (11), the difference in radius of curvature between the object-side surface of the negative lens L21 and the image-side surface of the positive lens L22 becomes too large. Accordingly, the spherical aberration and coma aberration tend to occur easily. When the value of (RL22b−RL21a)/(RL22b+RL21a) falls below the lower limit of the conditional expression (11), the difference in radius of curvature between the object-side surface of the negative lens L21 and the image-side surface of the positive lens L22 becomes too small. Accordingly, the aberration correction becomes insufficient.

Satisfying the conditional expression (11) facilitates a successful reduction or elimination of the spherical aberration and coma aberration over the entire capturing distance.

Figure 29A:
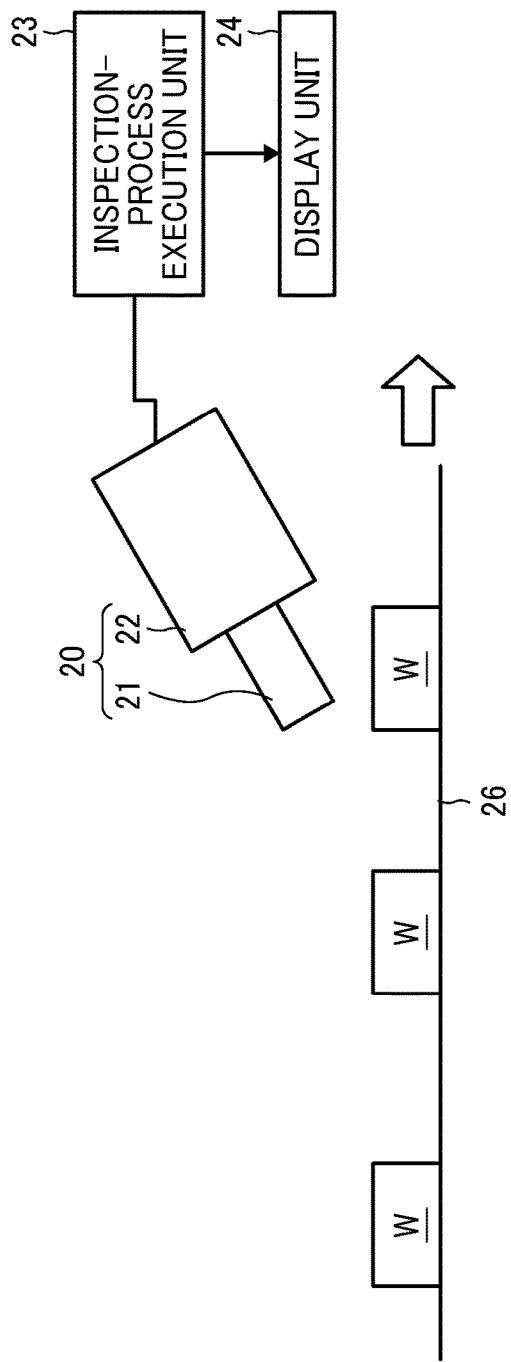
FIG. 29A is an illustration of an imaging device according to an embodiment of the present disclosure.
Figure 29B:
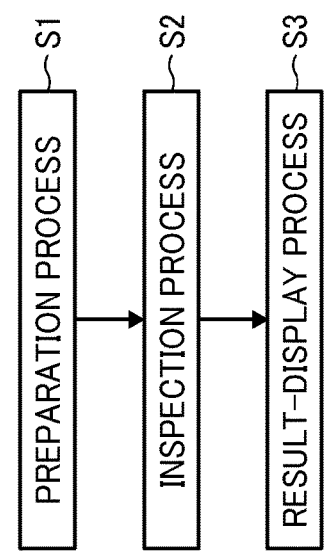
FIG. 29B is a flowchart of product inspection processing.

With reference to FIGS. 29A and 29B, a description is given of a product inspection apparatus according to an embodiment of the present disclosure that employs the imaging apparatus equipped with the imaging lens system according to an embodiment of the present disclosure.

The product inspection apparatus described below inspects a product.

There are various types of inspections and inspection items in the product inspection. The following describes cases where a product to be manufactured in large numbers is inspected for the presence or absence of a scratch.

The product inspection apparatus in FIG. 29A includes an imaging device 20, an inspection-process execution unit 23, and a display unit 24. FIG. 29A also indicates a product W and a product conveyance belt 26 (or simply referred to as a conveyance belt).

The imaging device 20 serves as a camera of the product inspection apparatus, and includes an imaging optical system 21 and an image processor 22.

The products W to be inspected are placed at equal intervals on the conveyance belt 26, and conveyed by the conveyance belt 26 in the direction of the arrow (rightward in the drawing) at a constant velocity.

The imaging optical system 21 according to any of the first example to the seventh example is configured to form an image of the product W to be inspected. Examples of the imaging optical system 21 include the imaging lens system 100 according to any of the first example to the seventh example. Accordingly, the imaging optical system 21 is referred to as an imaging lens system (21 in this example).

FIG. 29B is a flowchart of product inspection processing performed by the product inspection apparatus, including a preparation process (S1), an inspection process (S2), and a result-display process (S3). In the inspection process (S2) and the result-display process (S3), a product W is inspected.

In the preparation process (S1), inspection conditions are set.

That is, the product inspection apparatus determines a capturing position at which the imaging lens system 21 captures an image and a capturing orientation (an orientation of an imaging lens and/or a distance to the object to be captured) based on the size and shape of the product W conveyed by the conveyance belt 26). The distance to the object corresponds to the working distance to be described in the description of the examples.

Then, the product inspection apparatus changes the focus of the imaging lens system 21 (the numeral reference of the imaging lens system is 21 in this example) according to the position and the size of the scratch to be inspected for the presence or absence. The imaging lens system 100 according to the first example to the seventh example is capable of focusing. Accordingly, the imaging lens system 100 according to the first example to the seventh example changes the focus with the object distance appropriately set according to the inspection item (the presence or absence of a scratch in this example).

A model product confirmed to be free of scratches is placed on the inspection position on the conveyance belt 26, and captured by the imaging lens system 21.

In this case, an area sensor such as a solid-state image sensor of the image processor 22 is used to capture an image of the model product, and the image processor 22 performs image processing on the image captured by the area sensor to obtain digitalize image data (information), i.e., digital data.

The obtained digital data is sent to the inspection-process execution unit 23 to be stored as model data in the inspection-process execution unit 23.

In the inspection process (S2), the product W is placed on the conveyance belt 26 in the same manner, and sequentially conveyed by the conveyance belt 26. When each product W to be conveyed passes the inspection position, the imaging lens system 21 captures an image of the product W. Then, the image processor 22 digitalizes the image and send the digital data to the inspection-process execution unit 23.

The inspection-process execution unit 23 is configured as computer or a central processing unit (CPU). The inspection-process execution unit 23 controls the image processor 22 to adjust a capturing operation or a focusing operation of the imaging lens system 21.

In response to a reception of the image data of the product W digitalized by the image processor 22, the inspection-process execution unit 23 matches the received image data to the stored model data.

When the inspection-process execution unit 23 fails to match the image data to the model data, it means that there is a scratch on the captured product W. Accordingly, the inspection-process execution unit 23 determines that the product W is defective.

When the inspection-process execution unit 23 successfully matches the image data to the model data, it means that the product W has no scratches. Accordingly, the inspection-process execution unit 23 determines that the product W is good.

In the result-display process (S3), the inspection-process execution unit 23 displays the determination results for each product regarding whether the product is a good product or detective product on the display unit 24.

In the configuration of the product inspection apparatus, the inspection-process execution unit 23 and the display unit 24 constitute an inspection-process execution unit.

Numerical Example of Imaging Lens System

The following describes specific seven examples of the imaging lens system 100.

The meanings of symbols in Examples 1 through 8 are described below.

F: F number
Y': image height
R: radius of curvature;

D: distance between surfaces (which is referred to also as surface distance);
Nd: Refractive index for d-line
vd: Abbe number for d-line
BF: back focus;
$\theta_{gF}$: partial dispersion ratio; and
WD: working distance (a distance from an object to the vertex of the object-side surface of the lens closest to the object: the unit of length, which is a dimension, is mm unless otherwise mentioned).

First Example

FIG. 1 is an illustration of a lens configuration of an imaging lens system 100 according to the first example.

FIG. 30 is Table 1 indicating data of the imaging lens system 100 according to the first example in which a focal length f is 34.99, an F number is 2.46, and a half angle of view ω is 8.90.

The symbol "A" in the column "D" (distance between surfaces) denotes a variable distance between the second lens group G2 and the third lens group G3 with a change in focus. The same applies to the second example described later.

FIG. 31 is Table 2 indicating the variable distance.
FIG. 32 is Table 3 indicating the values of parameters of the conditional expressions.

Second Example

FIG. 2 is an illustration of a lens configuration of an imaging lens system 100 according to the second example.

FIG. 33 is Table 4 indicating data of the imaging lens system 100 according to the second example in which a focal length f is 34.98, an F number is 2.46, and a half angle of view ω is 8.9°.

FIG. 34 is Table 5 indicating the variable distance.
FIG. 35 is Table 6 indicating the values of parameters of the conditional expressions.

Third Example

FIG. 3 is an illustration of a lens configuration of an imaging lens system 100 according to the third example.

FIG. 36 is Table 7 indicating data of the imaging lens system 100 according to the second example in which a focal length f is 35.00, an F number is 2.46, and a half angle of view ω is 8.9°.

FIG. 37 is Table 8 indicating the variable distance.
FIG. 38 is Table 9 indicating the values of parameters of the conditional expressions.

Fourth Example

FIG. 4 is an illustration of a lens configuration of an imaging lens system 100 according to the fourth example.

FIG. 39 is Table 10 indicating data of the imaging lens system 100 according to the fourth example in which a focal length f is 34.99, an F number is 2.46, and a half angle of view ω is 8.9°.

FIG. 40 is Table 11 indicating the variable distance.
FIG. 41 is Table 12 indicating the values of parameters of the conditional expressions.

Fifth Example

FIG. 5 is an illustration of a lens configuration of an imaging lens system 100 according to the fifth example.

FIG. 42 is Table 13 indicating data of the imaging lens system 100 according to the fifth example in which a focal length f is 35.00, an F number is 2.46, and a half angle of view ω is 8.9°.

FIG. 43 is Table 14 indicating the variable distance.
FIG. 44 is Table 15 indicating the values of parameters of the conditional expressions.

Sixth Example

FIG. 6 is an illustration of a lens configuration of an imaging lens system 100 according to the sixth example.

FIG. 45 is Table 16 indicating data of the imaging lens system 100 according to the sixth example in which a focal length f is 34.99, an F number is 2.45, and a half angle of view ω is 8.9°.

FIG. 46 is Table 17 indicating the variable distance.
FIG. 47 is Table 18 indicating the values of parameters of the conditional expressions.

Seventh Example

FIG. 7 is an illustration of a lens configuration of an imaging lens system 100 according to the seventh example.

FIG. 48 is Table 19 indicating data of the imaging lens system 100 according to the seventh example in which a focal length f is 34.99, an F number is 2.45, and a half angle of view ω is 8.9°.

FIG. 49 is Table 20 indicating the variable distance.
FIG. 50 is Table 21 indicating the values of parameters of the conditional expressions.

Figure 8:
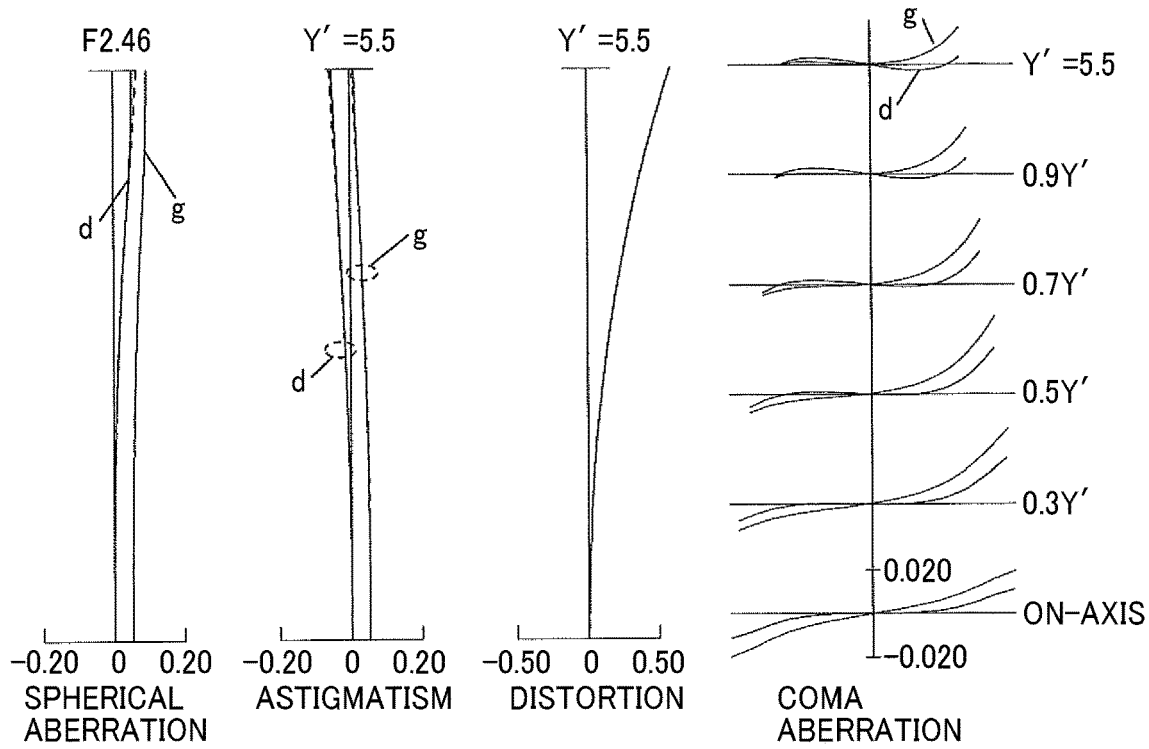
FIG. 8 is an aberration diagram of the imaging lens system according to the first example focused at infinity.
Figure 9:
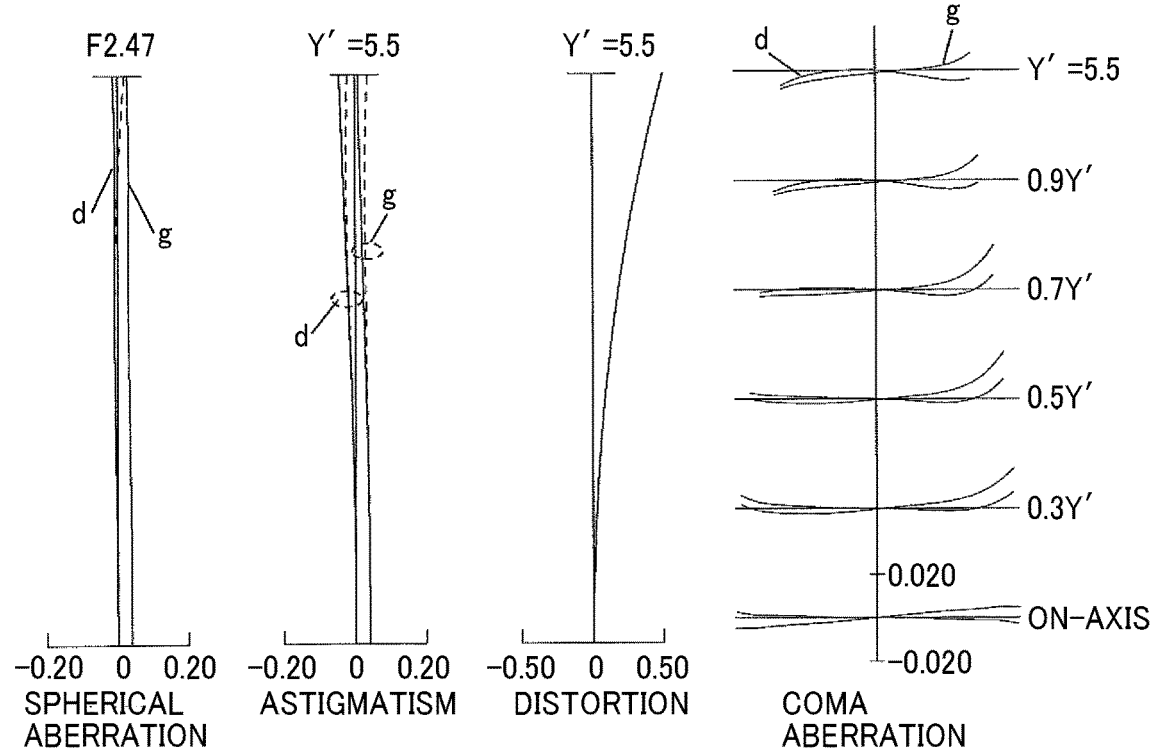
FIG. 9 is an aberration diagram of the image forming lens system according to the first example focused at a working distance of 0.25 meters (m)
Figure 10:
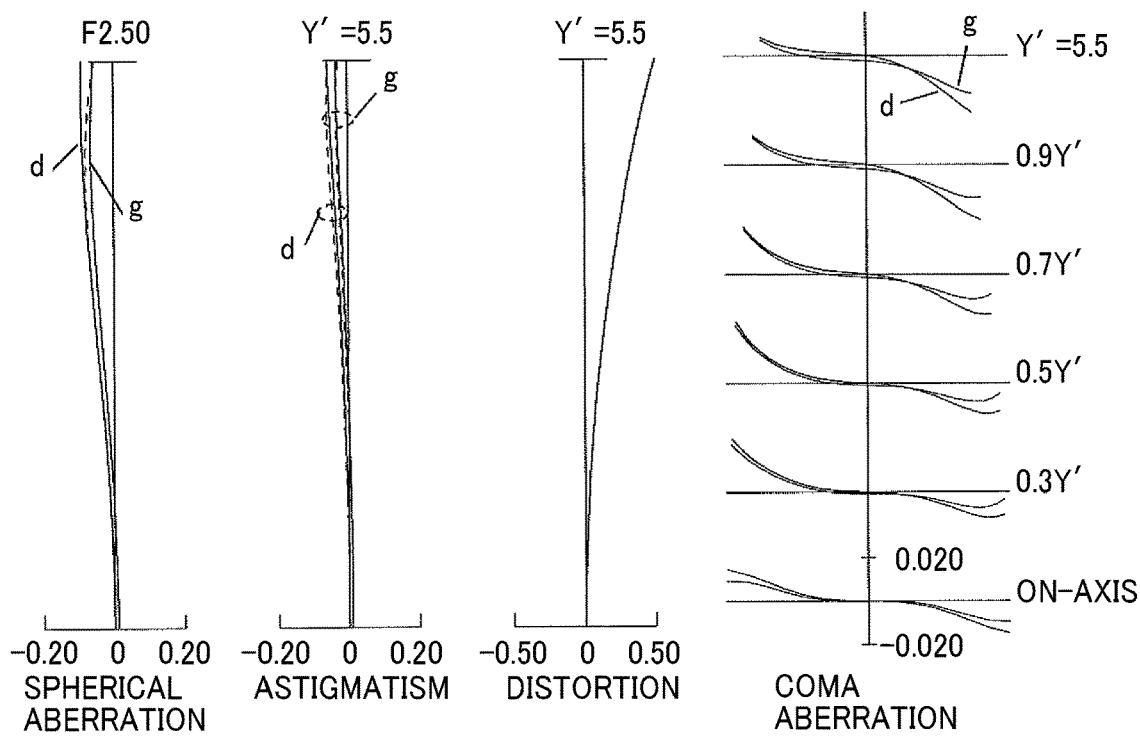
FIG. 10 is an aberration diagram of the image forming lens system according to the first example focused at a working distance of 0.10 m.

FIGS. 8 to 10 are aberration diagrams of the imaging lens system 100 according to the first example. FIG. 8 is a set of aberration diagrams of the imaging lens system 100 focused at infinity. FIG. 9 is a set of aberration diagrams of the imaging lens system 100 focused at a working distance of 0.25 m (the long distance). FIG. 10 is a set of aberration diagrams of the imaging lens system 100 focused at a working distance of 0.10 m (the close distance).

In the aberration diagrams of the first example to the seventh example, a broken line in the spherical aberration indicates the sine condition, and a solid line and a broken line in astigmatism indicate sagittal and meridional, respectively.

Figure 11:
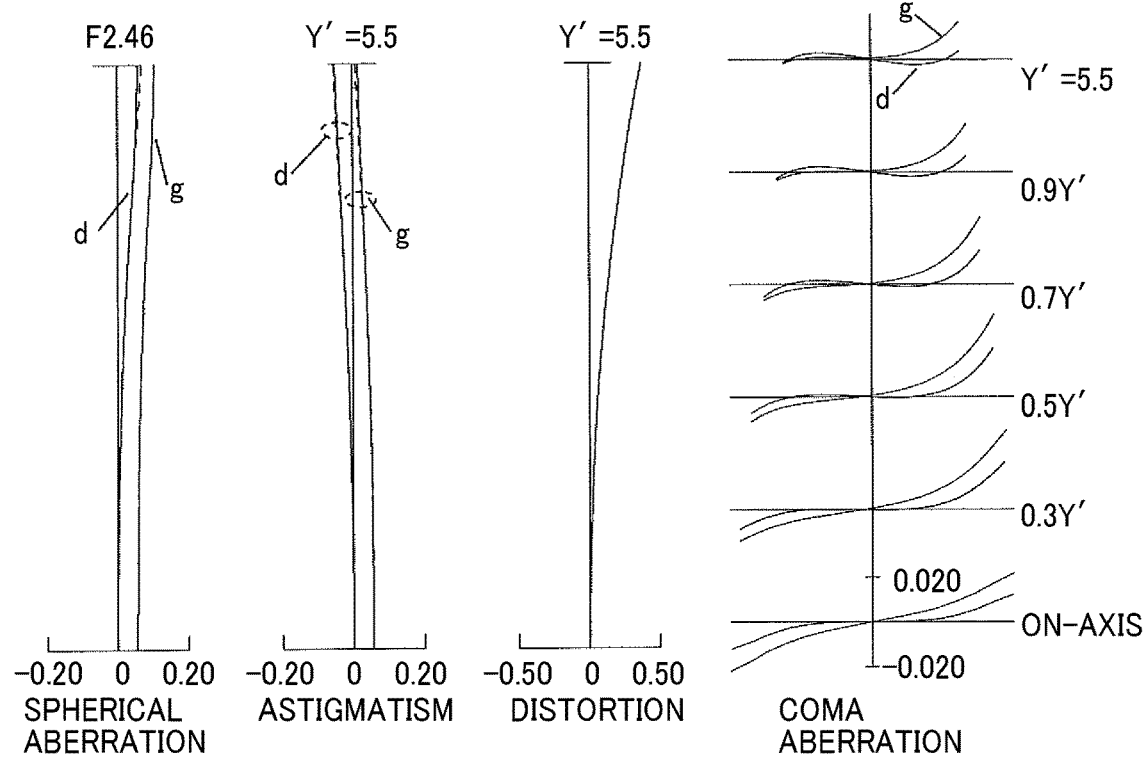
FIG. 11 is an aberration diagram of the image forming lens system according to the second example focused at infinity.
Figure 12:
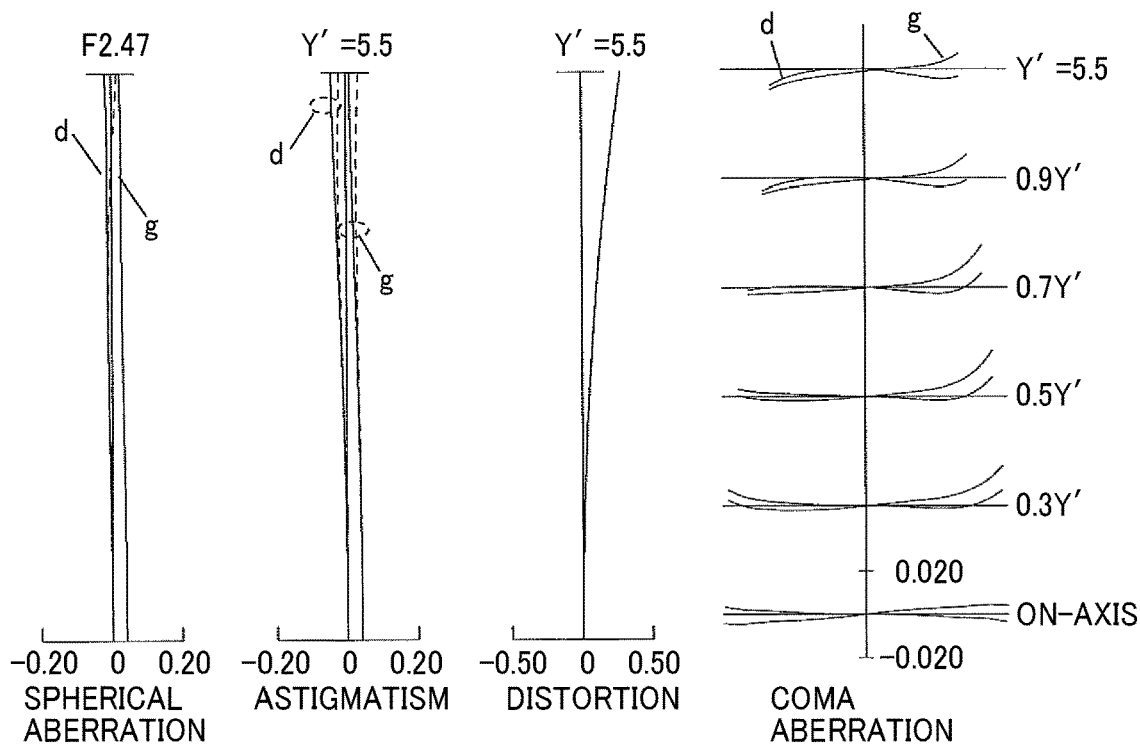
FIG. 12 is an aberration diagram of the image forming lens system according to the second example focused at a working distance of 0.25 m.
Figure 13:
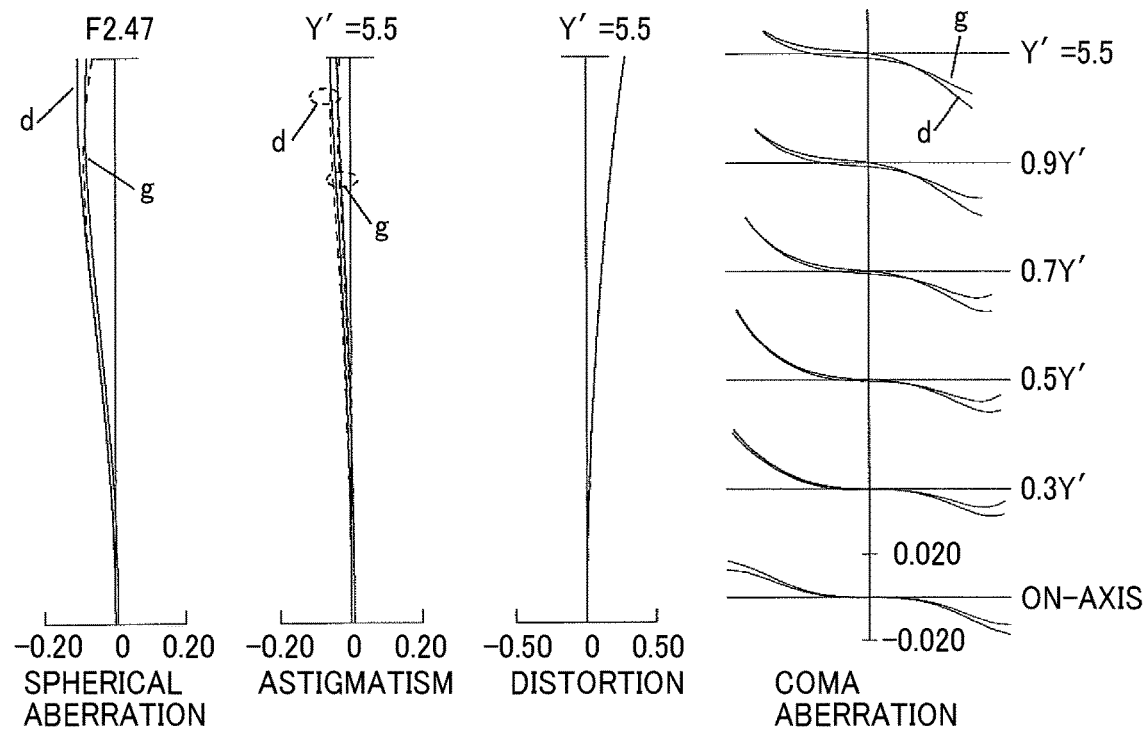
FIG. 13 is an aberration diagram of the image forming lens system according to the second example focused at a working distance of 0.10 m.

FIGS. 11 to 13 are aberration diagrams of the imaging lens system 100 according to the second example. FIG. 11 is a set of aberration diagrams of the imaging lens system 100 focused at infinity. FIG. 12 is a set of aberration diagrams of the imaging lens system 100 focused at a working distance of 0.25 m (the long distance). FIG. 13 is a set of aberration diagrams of the imaging lens system 100 focused at a working distance of 0.10 m (the close distance).

Figure 14:
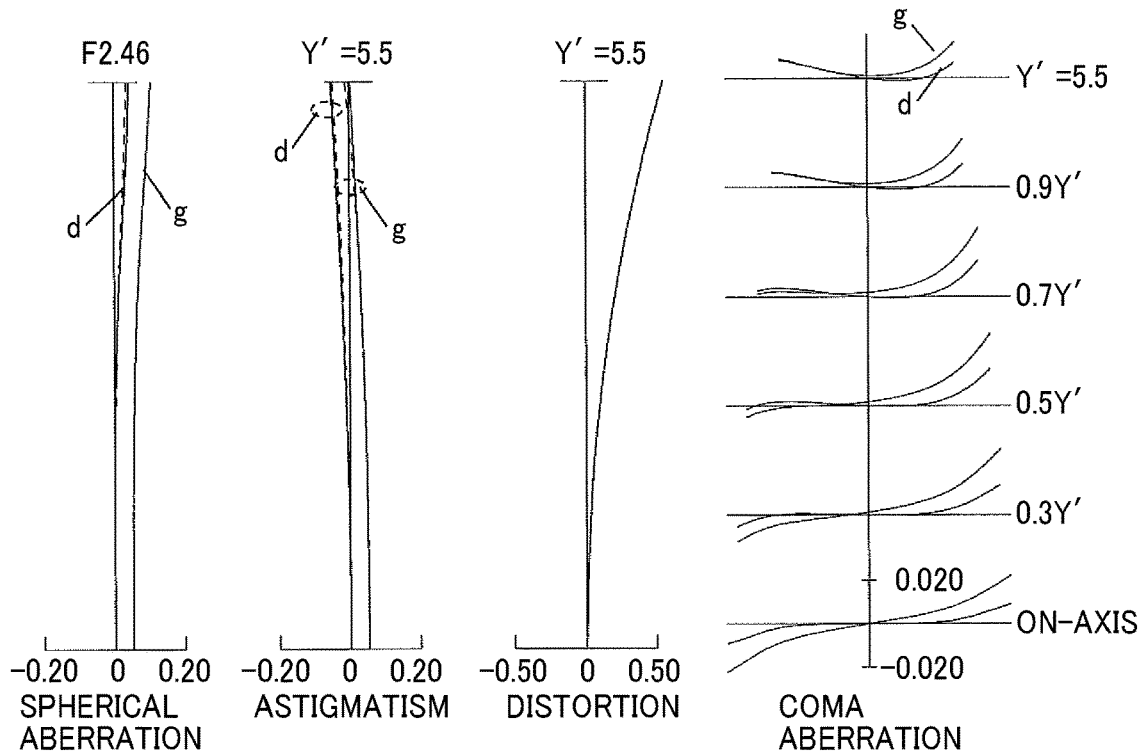
FIG. 14 is an aberration diagram of the image forming lens system according to the third example focused at infinity.
Figure 15:
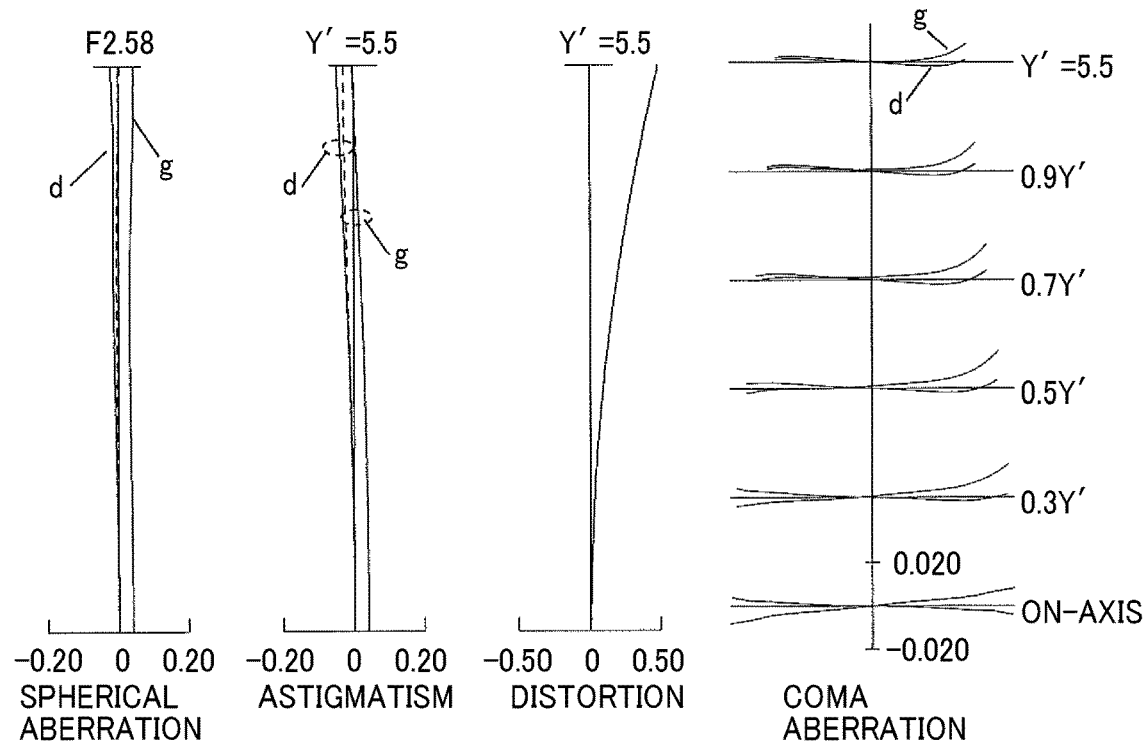
FIG. 15 is an aberration diagram of the image forming lens system according to the third example focused at a working distance of 0.25 m.
Figure 16:
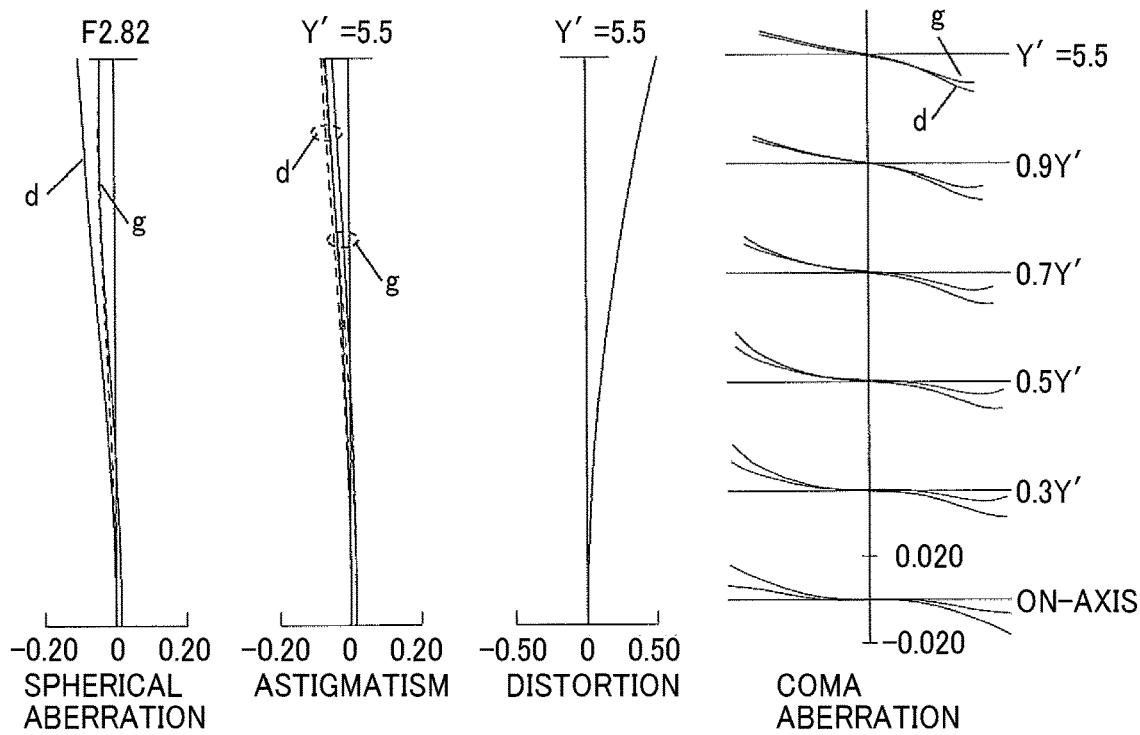
FIG. 16 is an aberration diagram of the image forming lens system according to the third example focused at a working distance of 0.10 m.

FIGS. 14 to 16 are aberration diagrams of the imaging lens system 100 according to the third example. FIG. 14 is a set of aberration diagrams of the imaging lens system 100 focused at infinity. FIG. 15 is a set of aberration diagrams of the imaging lens system 100 focused at a working distance of 0.25 m (the long distance). FIG. 16 is a set of aberration diagrams of the imaging lens system 100 focused at a working distance of 0.10 m (the close distance).

Figure 17:
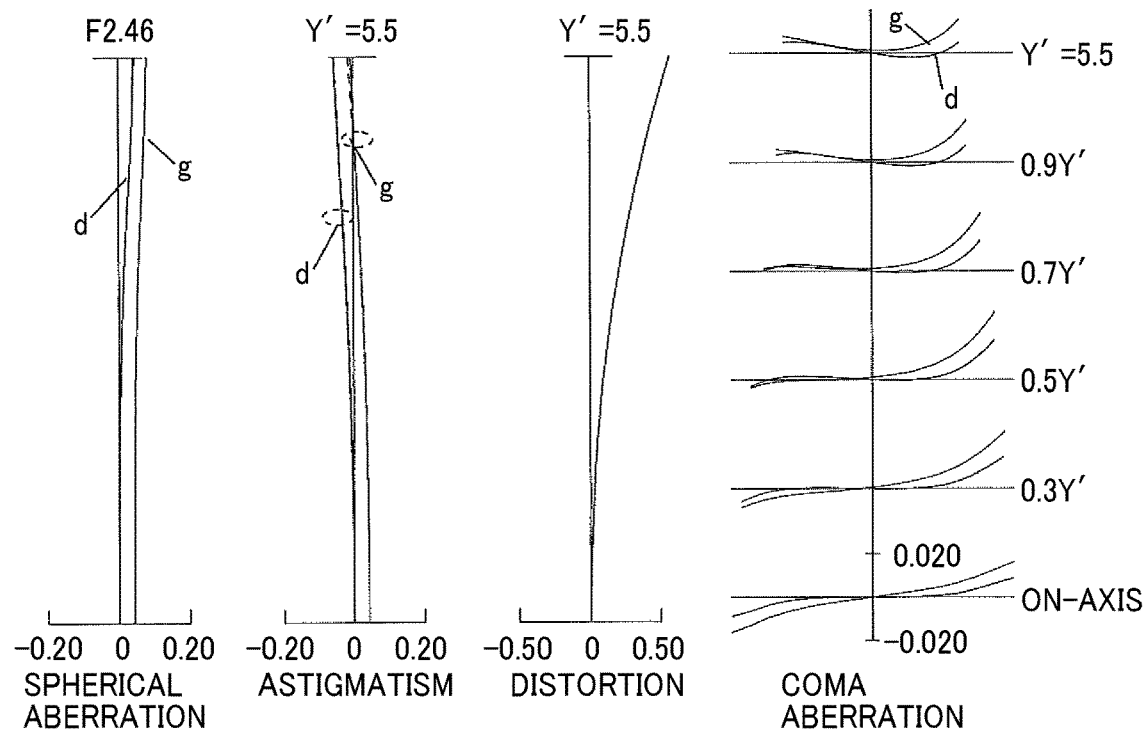
FIG. 17 is an aberration diagram of the image forming lens system according to the fourth example focused at infinity.
Figure 18:
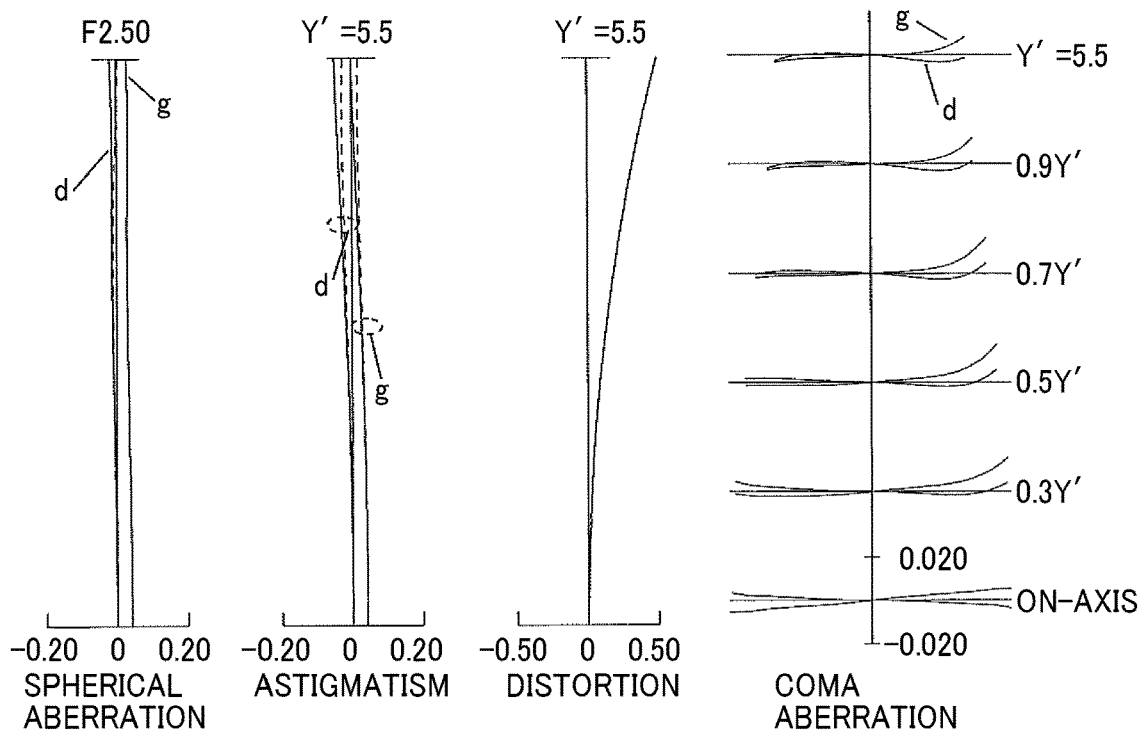
FIG. 18 is an aberration diagram of the image forming lens system according to the fourth example focused at a working distance of 0.25 m.
Figure 19:
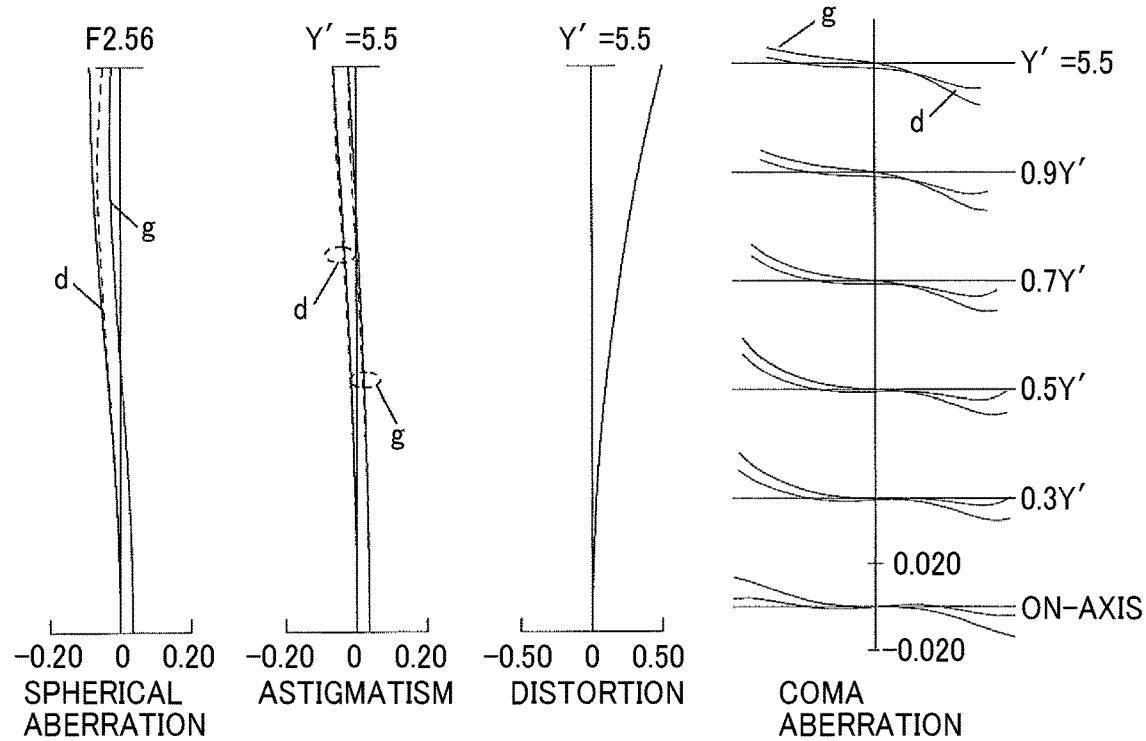
FIG. 19 is an aberration diagram of the image forming lens system according to the fourth example focused at a working distance of 0.10 m.

FIGS. 17 to 19 are aberration diagrams of the imaging lens system 100 according to the fourth example. FIG. 17 is a set of aberration diagrams of the imaging lens system 100 focused at infinity. FIG. 18 is a set of aberration diagrams of the imaging lens system 100 focused at a working distance of 0.25 m (the long distance). FIG. 19 is a set of aberration diagrams of the imaging lens system 100 focused at a working distance of 0.10 m (the close distance).

Figure 20:
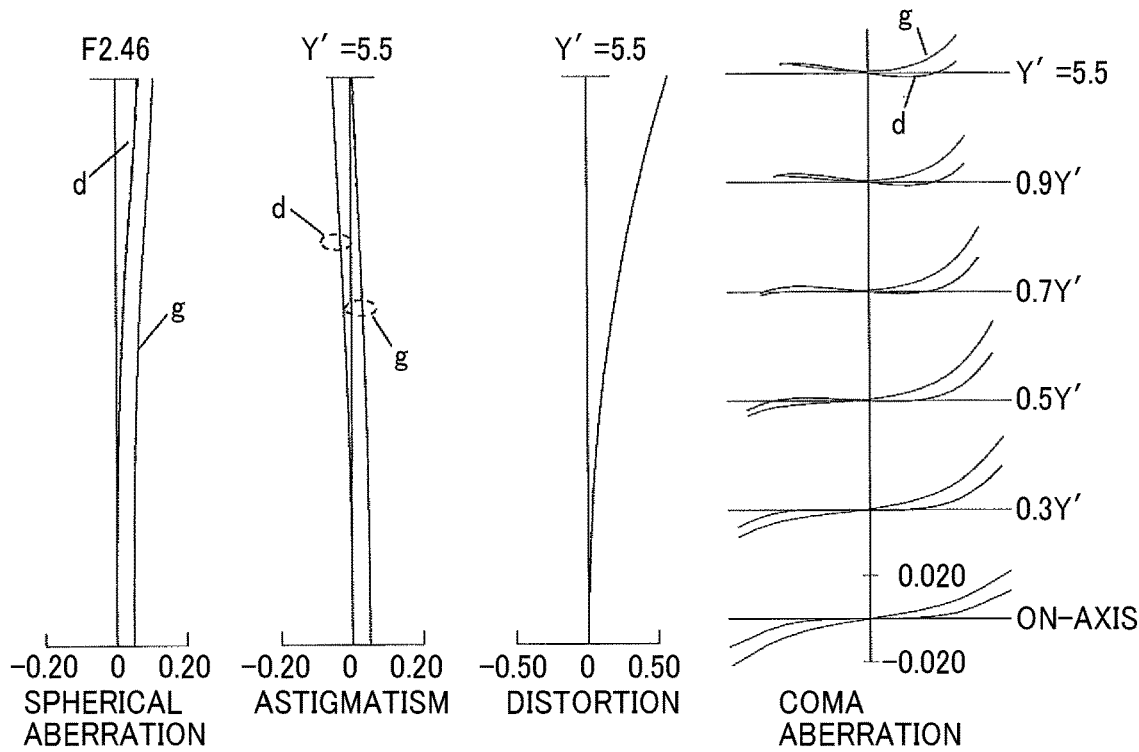
FIG. 20 is an aberration diagram of the image forming lens system according to the fifth example focused at infinity.
Figure 21:
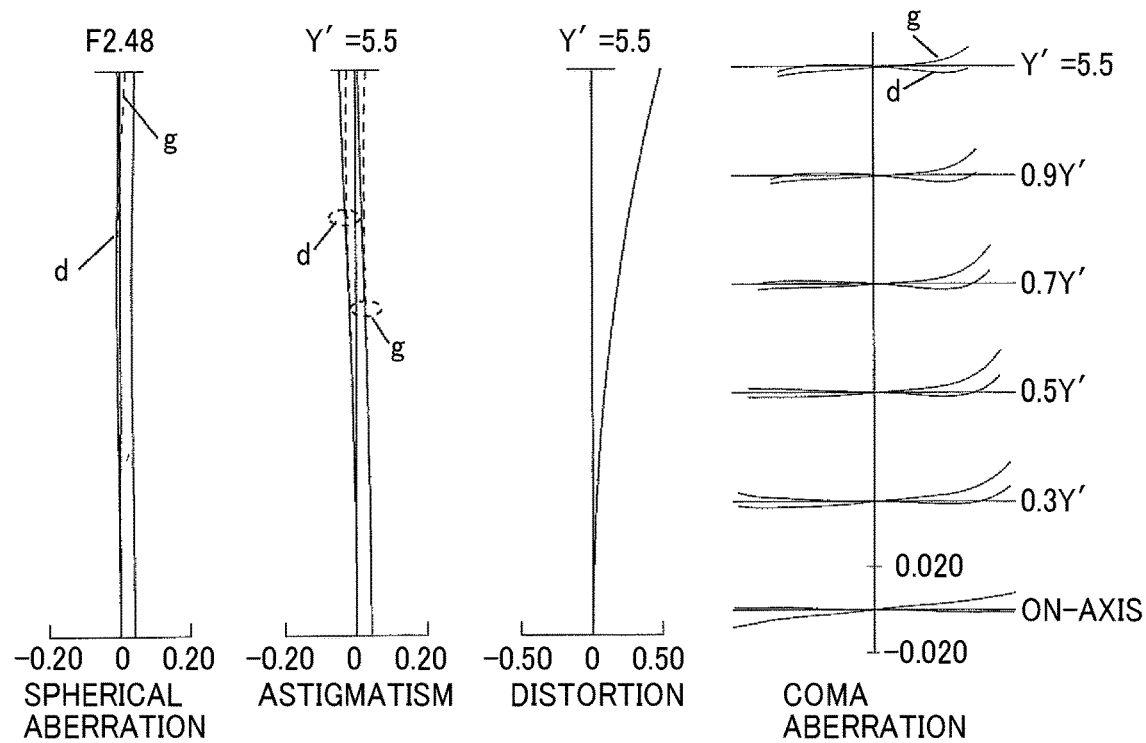
FIG. 21 is an aberration diagram of the image forming lens system according to the fifth example focused at a working distance of 0.25 m.
Figure 22:
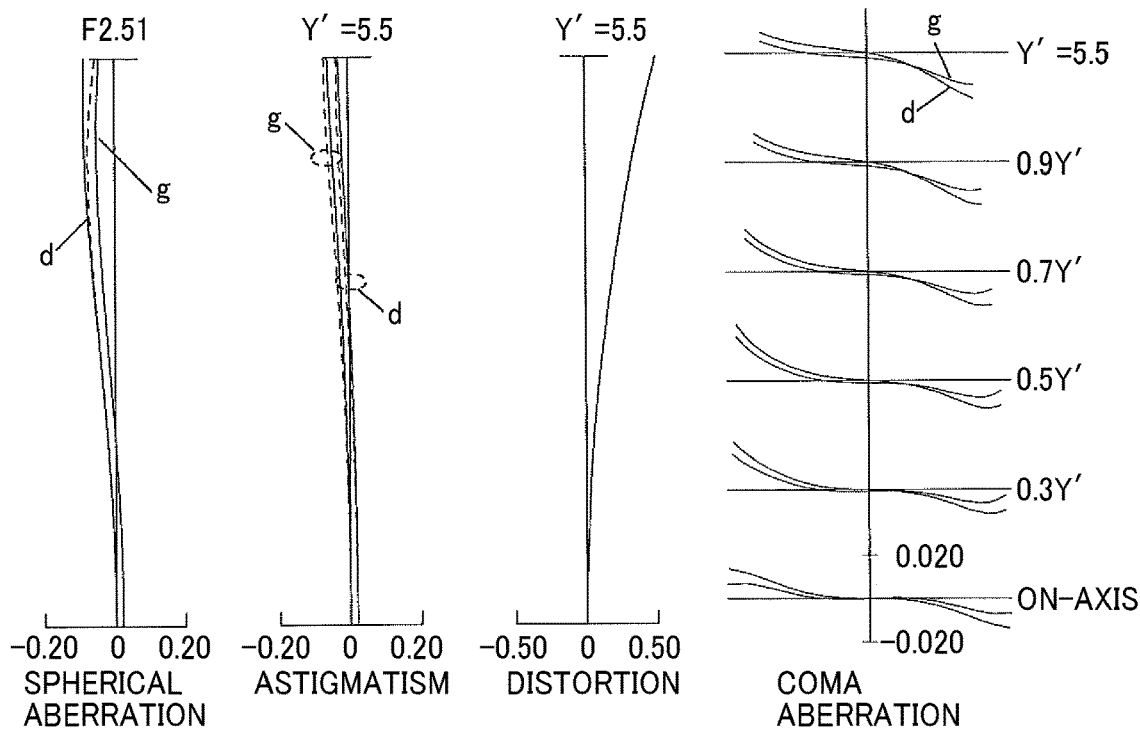
FIG. 22 is an aberration diagram of the image forming lens system according to the fifth example focused at a working distance of 0.10 m.

FIGS. 20 to 22 are aberration diagrams of the imaging lens system 100 according to the fifth example. FIG. 20 is a set of aberration diagrams of the imaging lens system 100 focused at infinity. FIG. 21 is a set of aberration diagrams of the imaging lens system 100 focused at a working distance of 0.25 m (the long distance). FIG. 22 is a set of aberration diagrams of the imaging lens system 100 focused at a working distance of 0.10 m (the close distance).

Figure 23:
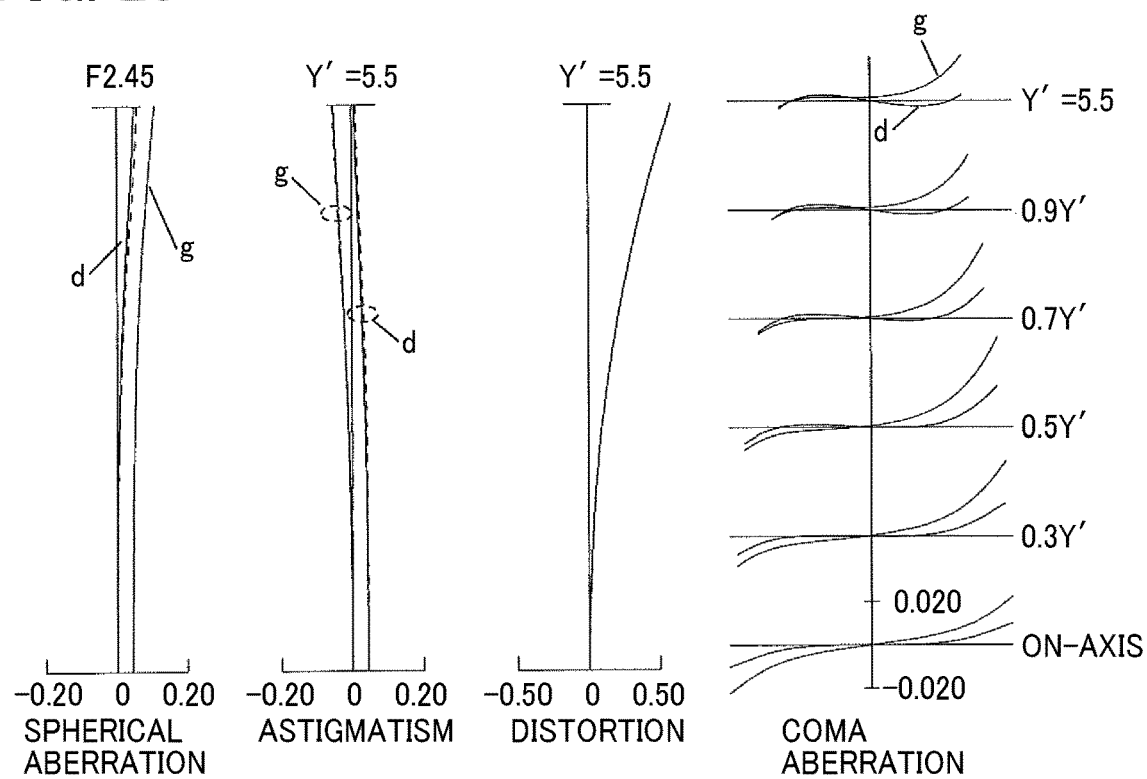
FIG. 23 is an aberration diagram of the image forming lens system according to the sixth example focused at infinity.
Figure 24:
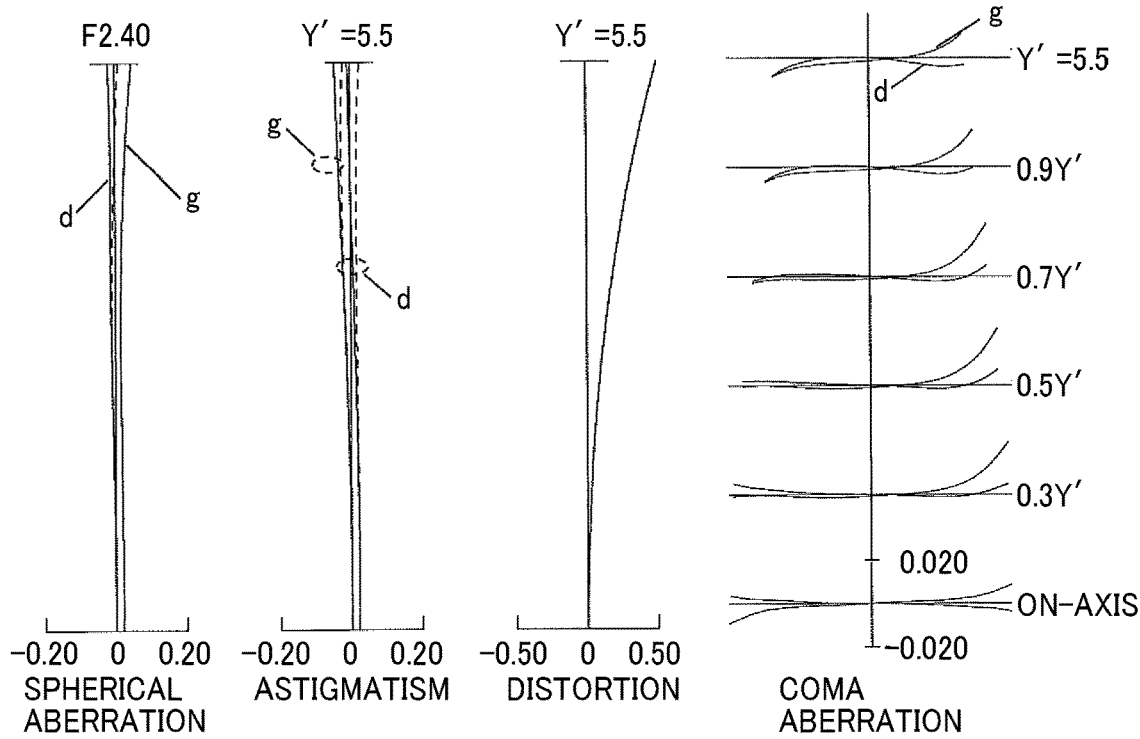
FIG. 24 is an aberration diagram of the image forming lens system according to the sixth example focused at a working distance of 0.25 m.
Figure 25:
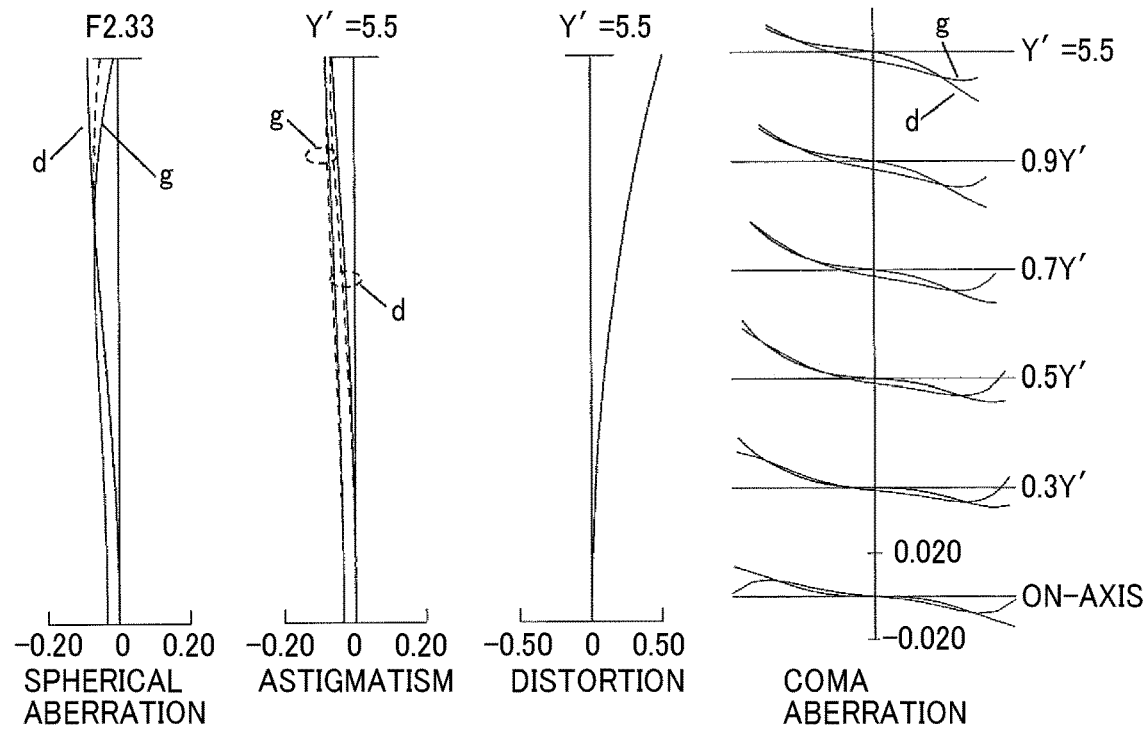
FIG. 25 is an aberration diagram of the image forming lens system according to the sixth example focused at a working distance of 0.10 m.

FIGS. 23 to 25 are aberration diagrams of the imaging lens system 100 according to the sixth example. FIG. 23 is a set of aberration diagrams of the imaging lens system 100 focused at infinity. FIG. 24 is a set of aberration diagrams of the imaging lens system 100 focused at a working distance of 0.25 m (the long distance). FIG. 25 is a set of aberration diagrams of the imaging lens system 100 focused at a working distance of 0.10 m (the close distance).

Figure 26:
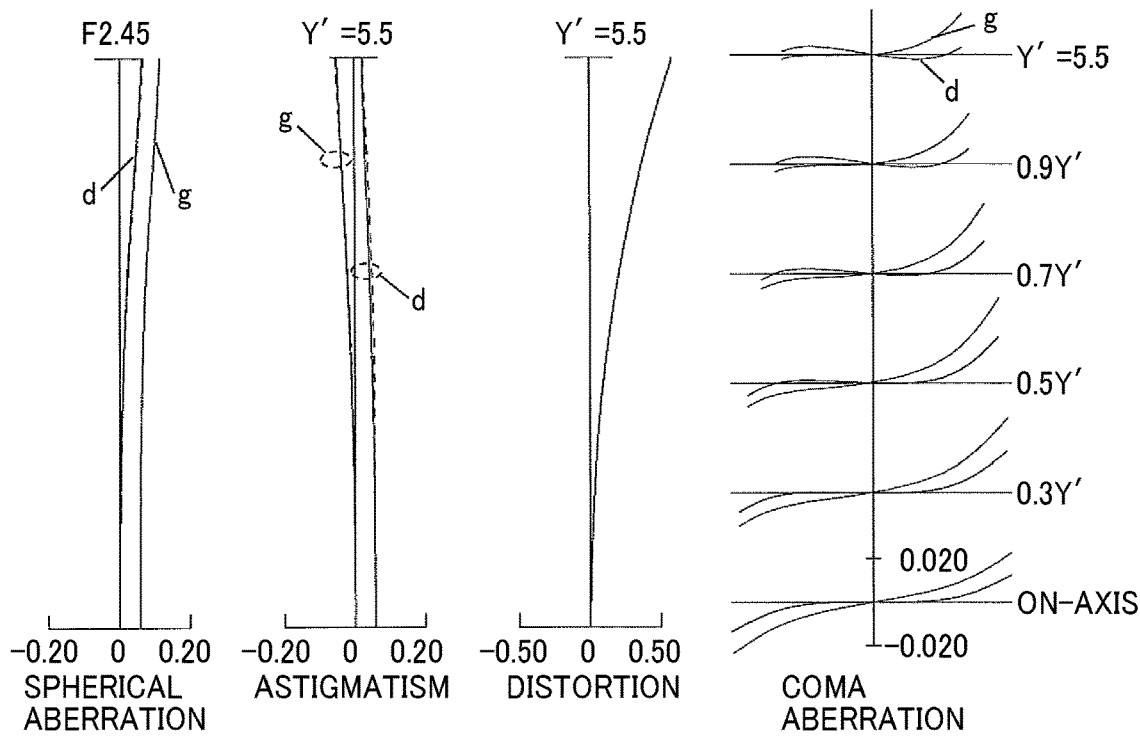
FIG. 26 is an aberration diagram of the image forming lens system according to the seventh example focused at infinity.
Figure 27:
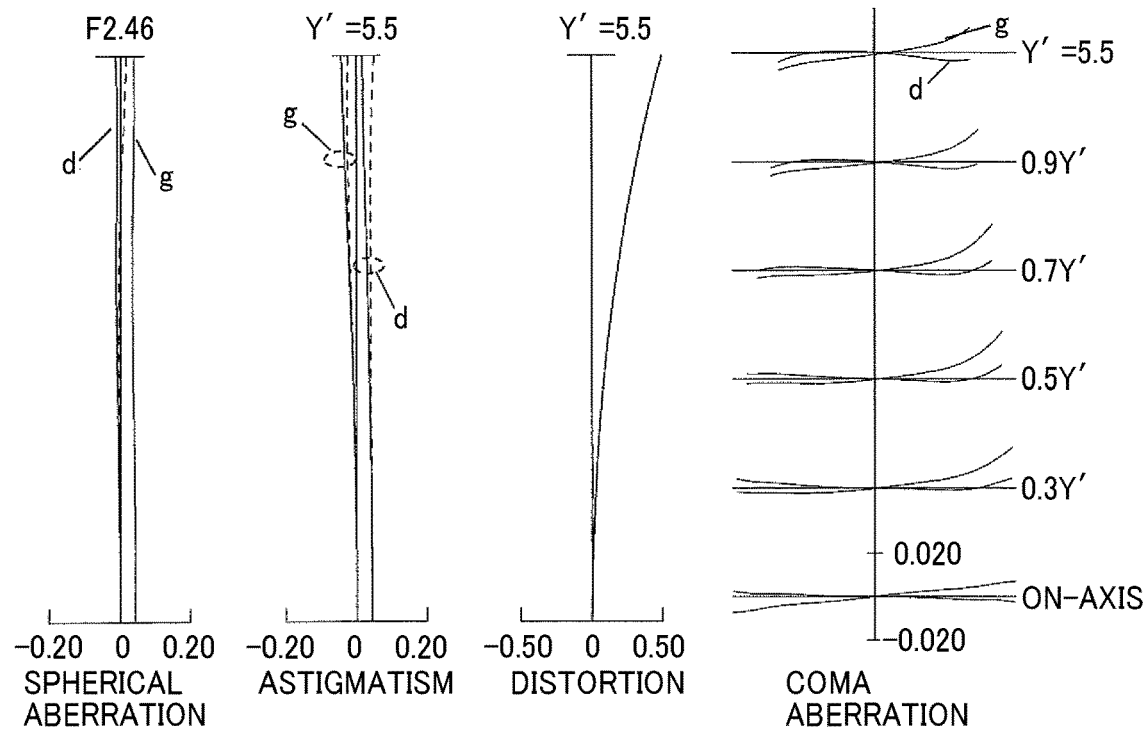
FIG. 27 is an aberration diagram of the image forming lens system according to the seventh example focused at a working distance of 0.25 m.
Figure 28:
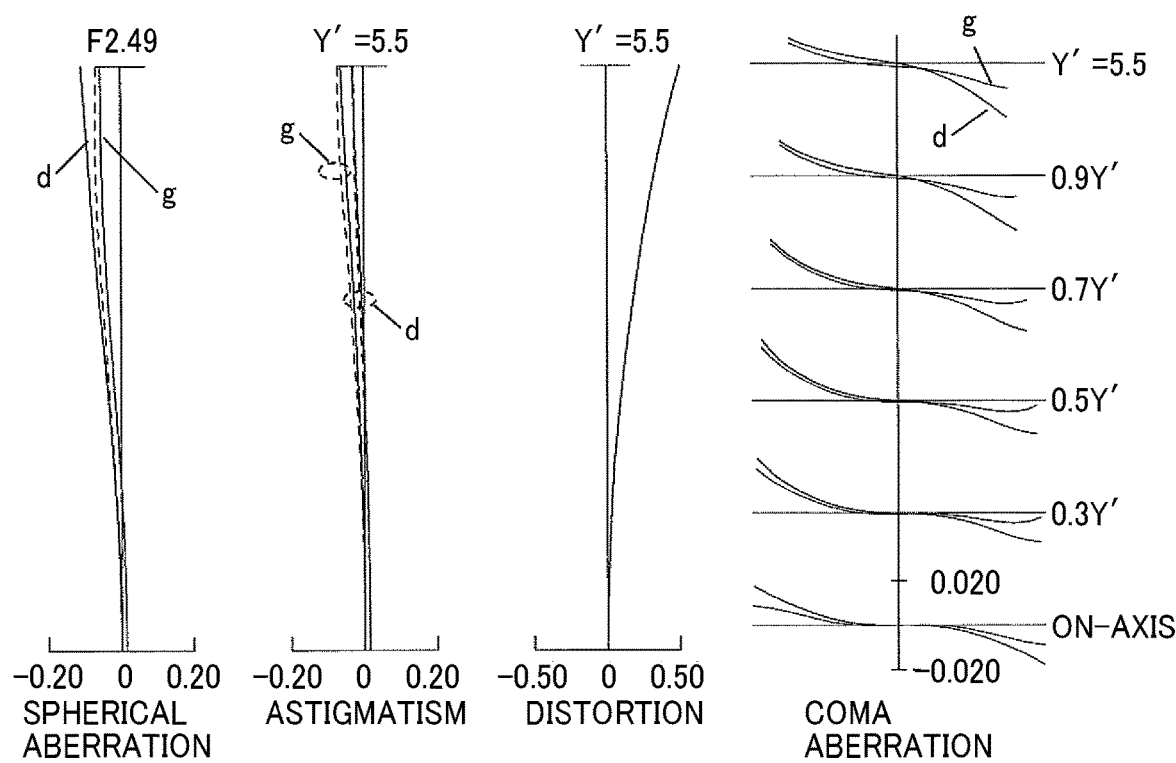
FIG. 28 is an aberration diagram of the image forming lens system according to the seventh example focused at a working distance of 0.10 m.

FIGS. 26 to 28 are aberration diagrams of the imaging lens system 100 according to the seventh example. FIG. 26 is a set of aberration diagrams of the imaging lens system 100 focused at infinity. FIG. 27 is a set of aberration diagrams of the imaging lens system 100 focused at a working distance of 0.25 m (the long distance). FIG. 28 is a set of aberration diagrams of the imaging lens system 100 focused at a working distance of 0.10 m (the close distance).

As is apparent from the above-described aberration diagrams, various aberrations are corrected more accurately, spherical aberration caused by focusing is sufficiently eliminated or reduced, and coma aberration and field curvature are successfully eliminated or reduced up to the most peripheral portion of the lenses in each of the first example to the seventh example. Moreover, the axial chromatic aberration and lateral chromatic aberration are successfully reduced or eliminated as well, and the absolute value of the distortion is reduced to less than 0.6% over the range from the close distance to infinity.

The imaging lens system 100 according to any of the first example to the seventh example achieves a reduction in various aberrations. The imaging lens system 100 according to any of the first example to the seventh example has an angle of view of approximately 9°, a F-number of approximately 2.4, and a resolution corresponding up to area sensors of approximately from 5 million to 8 million pixels. That is, the imaging lens system 100 according to any of the first example to the seventh example is capable of displaying, as a line, a line ranging from infinity to the close distance of the working distance of 0.1 m, and achieves a high-performance with little change in optical performance due to focusing.

Although the embodiments of the present disclosure have been described above, the present disclosure is not limited to the embodiments described above, and a variety of modifications can naturally be made within the scope of the present disclosure.

Although the embodiments of the present disclosure have been described above, the present disclosure is not limited to the embodiments described above, but a variety of modifications can naturally be made within the scope of the present disclosure.

Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An imaging lens system, comprising:
a first lens group having positive refractive power;
a stop;
a second lens group having positive refractive power; and
a third lens group having one of positive refractive power and negative refractive power, disposed in that order from an object side to an image side,
the first lens group including only a first-group-first positive lens and a first-group-second negative lens, disposed in that order from the object side to the image side,
the third lens group including a third-group-first negative lens and a third-group-second positive lens having a fixed distance from one another, disposed in that order from the object side to the image side,
a combination of the first lens group and the second lens group moving together as a single unit to the object side in focusing from infinity to a close distance to increase a distance between the second lens group and the third lens group, which does not move during the focusing, and
a conditional expression (1) below being satisfied:

$$0.40<dL31-L32/L3g<0.75 \quad (1)$$

where dL31−L32 denotes air spacing between the third-group-first negative lens and the third-group-second positive lens in the third lens group, and
L3g denotes a distance along the optical axis between an object-side surface of the third-group-first negative lens and an image-side surface of the third-group-second positive lens, and
wherein conditional expressions (5) and (6) below are satisfied:

$$55.0<vdn<95.0 \quad (5)$$

$$-5.0<vdn-vdp<15.0 \quad (6)$$

where
vdp denotes the Abbe number of material of the first-group-first positive lens with respect to the d-line, and
vdn denotes the Abbe number of material of the first-group-second negative lens with respect to the d-line.

2. The imaging lens system according to claim 1, wherein conditional expressions (2), (3), and (4) below are satisfied:

$$1.50<nd<1.63 \quad (2)$$

$$62.0<vd<78.0 \quad (3)$$

$$0.004<\theta_{g,F}-(-0.001742\times vd+0.6490)<0.030 \quad (4)$$

where
nd denotes a refractive index material of the first-group-first positive lens with respect to d-line,
vd denotes the Abbe number of material of the first-group-first positive lens, and
$\theta_{g,F}$ denotes a partial dispersion ratio of the material of the first-group-first positive lens in the first lens group.

3. The imaging lens system according to claim 1, wherein conditional expression (7) below is satisfied:

$$0.70<f lg2g/f<0.95 \quad (7)$$

where
f denotes a focal length of entirety of the imaging lens system focused at infinity, and fLg2g denotes a combined focal length of the first lens group and the second lens group.

4. The imaging lens system according to claim 1, wherein conditional expression (8) below is satisfied:

$$0.35 < (RL11a - RL12b)/(RL11a + RL12b) < 0.55 \quad (8)$$

where

RL11a denotes a radius of curvature of an object-side lens of the first-group-first positive lens, and RL12b denotes a radius of curvature of an image-side lens of the first-group-second negative lens.

5. The imaging lens system according to claim 1, wherein conditional expression (9) below is satisfied:

$$-0.80 < fL11/fL12 < -0.60 \quad (9)$$

where fL11 denotes a focal length of the first-group first positive lens, and fL12 denotes a focal length of the first-group-second negative lens.

6. The imaging lens system according to claim 1, wherein conditional expression (10) below is satisfied:

$$-0.10 < (RL12b + RL21a)/(RL12b - RL21a) < 0.10 \quad (10)$$

where

RL12b denotes a radius of curvature of an image-side surface of the first-group second negative lens, and RL21a denotes a radius of curvature of an object-side surface of a second-group-first lens closest to the object in the second lens group.

7. The imaging lens system according to claim 1, wherein the third lens group is mounted on an imaging plane in focusing from infinity to the close distance.

8. The imaging lens system according to claim 1, wherein the second lens group includes a second-group-first negative lens, a second-group-second positive lens, and a second-group-third positive lens, disposed in that order from the object side to the image side.

9. The imaging lens system according to claim 8, wherein conditional expression (11) below is satisfied:

$$0.05 < (RL22b - RL21a)/(RL22b + RL21a) < 0.22 \quad (11)$$

where

RL22b denotes a radius of curvature of an image-side surface of the second-group-second positive lens of the second lens group, and RL21a denotes a radius of curvature of an object-side surface of the second-group-first negative lens of the second lens group.

10. The imaging lens system according to claim 8, wherein conditional expression (12) below is satisfied:

$$0.35 < (RL23b - RL21a)/(RL23b + RL21a) < 0.70 \quad (12)$$

where

RL23b denotes a radius of curvature of an image-side surface of the second-group-third positive lens, and RL21a denotes the radius of curvature of the object-side surface of the second-group-first negative lens of the second lens group.

11. The imaging lens system according to claim 1, wherein each of the lenses constituting the first lens group, the second lens group, and the third lens group is a spherical lens.

12. The imaging lens system according to claim 1, wherein each of the lenses constituting the first lens group, the second lens group, and the third lens group is made of inorganic solid material.

13. An imaging device comprising the imaging lens system according to claim 1.

14. An imaging lens system, comprising:
a first lens group having positive refractive power; a stop; a second lens group having positive refractive power; and a third lens group having one of positive refractive power and negative refractive power, disposed in that order from an object side to an image side,
the first lens group including a first-group-first positive lens and a first-group-second negative lens, disposed in that order from the object side to the image side,
the third lens group including a third-group-first negative lens and a third-group-second positive lens, disposed in that order from the object side to the image side,
a combination of the first lens group and the second lens group moving together as a single unit to the object side in focusing from infinity to a close distance to increase a distance between the second lens group and the third lens group,
wherein a conditional expression (1) below is satisfied:

$$0.40 < dL31-L32/L3g < 0.75 \quad (1)$$

where dL31–L32 denotes air spacing between the third-group-first negative lens and the third-group-second positive lens in the third lens group, and L3g denotes a distance along the optical axis between an object-side surface of the third-group-first negative lens and an image-side surface of the third-group-second positive lens, and wherein conditional expressions (2) and (3) below are satisfied:

$$55.0 < vdn < 95.0 \quad (2)$$

$$-5.0 < vdn - vdp < 15.0 \quad (3)$$

where vdp denotes the Abbe number of material of the first-group-first positive lens with respect to the d-line, and vdn denotes the Abbe number of material of the first-group-second negative lens with respect to the d-line.

* * * * *